US 8,851,030 B2

(12) United States Patent
von Mayenburg

(10) Patent No.: US 8,851,030 B2
(45) Date of Patent: Oct. 7, 2014

(54) COMBUSTION ENGINE WITH STEPWISE VARIABLE COMPRESSION RATIO (SVCR)

(71) Applicant: Michael von Mayenburg, Villach-Landskron (AT)

(72) Inventor: Michael von Mayenburg, Villach-Landskron (AT)

(*) Notice: Subject to any disclaimer, the term of this patent is extended or adjusted under 35 U.S.C. 154(b) by 0 days.

(21) Appl. No.: 13/791,811

(22) Filed: Mar. 8, 2013

(65) Prior Publication Data
US 2013/0247879 A1 Sep. 26, 2013

Related U.S. Application Data

(60) Provisional application No. 61/615,195, filed on Mar. 23, 2012, provisional application No. 61/765,597, filed on Feb. 15, 2013.

(51) Int. Cl.
F02B 75/04 (2006.01)

(52) U.S. Cl.
CPC .................................. F02B 75/045 (2013.01)
USPC .. 123/48 B; 123/48 A; 123/78 A; 123/78 AA; 123/78 BA; 123/78 F

(58) Field of Classification Search
CPC ...... F02B 75/04; F02B 75/045; F02B 75/047; F02B 75/048; F02D 15/02; F16C 7/00
USPC .. 123/78 A, 78 AA, 78 BA, 78 E, 78 F, 48 A, 123/48 B
See application file for complete search history.

(56) References Cited

U.S. PATENT DOCUMENTS

| | | | |
|---|---|---|---|
| 1,112,832 A | 10/1914 | Pierce | |
| 1,386,114 A | 8/1921 | Jedrzykowski | |
| 1,463,474 A | 7/1923 | Lazier | |
| 1,931,705 A | 5/1930 | Peterson | |
| 2,151,853 A | 3/1939 | Jonville et al. | |
| 2,153,691 A | 4/1939 | Hironaka | |
| 2,212,935 A | 8/1940 | Hanahan et al. | |
| 3,087,342 A | 4/1963 | Caddell | |
| 3,633,552 A | 1/1972 | Huber | |

(Continued)

FOREIGN PATENT DOCUMENTS

| | | |
|---|---|---|
| DE | 852327 | 11/1952 |
| DE | 3644721 A1 | 7/1988 |

(Continued)

OTHER PUBLICATIONS

Office action dated Sep. 8, 2010, issued in U.S. Appl. No. 12/011,494, filed Jan. 25, 2008.

(Continued)

Primary Examiner — Lindsay Low
Assistant Examiner — Tea Holbrook
(74) Attorney, Agent, or Firm — Klarquist Sparkman, LLP

(57) ABSTRACT

The compression ratio of an internal combustion engine is adjustable in a stepwise fashion, such as by pivoting an extension of an eccentric connecting rod bearing. The projection extends into a chamber defined by a portion of a connecting rod coupling portion of a connecting rod assembly. Liquid is delivered to one side of the projection and removed from the opposite side of the projection to move the projection and thereby the eccentric connecting rod bearing from one position corresponding to one compression ratio to another position corresponding to another compression ratio.

53 Claims, 23 Drawing Sheets

(56) References Cited

U.S. PATENT DOCUMENTS

| | | |
|---|---|---|
| 4,152,955 A | 5/1979 | McWhorter |
| 4,215,660 A | 8/1980 | Finley |
| 4,301,695 A | 11/1981 | Reiher |
| 4,860,702 A | 8/1989 | Doundoulakis |
| 4,864,975 A | 9/1989 | Hasegawa |
| 5,025,757 A | 6/1991 | Larsen |
| 5,146,879 A * | 9/1992 | Kume et al. .................. 123/48 B |
| 5,404,770 A | 4/1995 | Kruger |
| 5,406,911 A | 4/1995 | Hefley |
| 5,417,185 A | 5/1995 | Beattie |
| 5,562,068 A | 10/1996 | Sugimoto et al. |
| 5,595,146 A | 1/1997 | Bollig et al. |
| 5,732,673 A | 3/1998 | Mandella |
| 5,908,014 A | 6/1999 | Leithinger |
| 5,960,750 A * | 10/1999 | Kreuter ....................... 123/48 B |
| 6,394,048 B1 | 5/2002 | Styron |
| 6,497,203 B1 * | 12/2002 | Rao et al. .................... 123/48 B |
| 6,547,053 B2 | 4/2003 | Shih |
| 6,705,255 B2 * | 3/2004 | Papaioannou et al. ...... 123/48 R |
| 6,732,683 B2 | 5/2004 | Weiss |
| 6,966,282 B2 | 11/2005 | Hirano |
| 7,191,741 B2 | 3/2007 | Hiyoshi et al. |
| 7,946,260 B2 | 5/2011 | von Mayenburg |
| 8,302,568 B2 * | 11/2012 | Lee et al. .................... 123/48 R |
| 2002/0002957 A1 | 1/2002 | Moteki et al. |
| 2003/0066418 A1* | 4/2003 | Styron et al. .................. 92/60.5 |
| 2003/0075125 A1 | 4/2003 | Kreuter |
| 2004/0168657 A1 | 9/2004 | Gooijer |
| 2005/0150471 A1 | 7/2005 | Styron |
| 2006/0112911 A1 | 6/2006 | Lawrence et al. |
| 2006/0137632 A1 | 6/2006 | Aoyama et al. |
| 2008/0314368 A1 | 12/2008 | von Mayenburg |
| 2009/0038588 A1 | 2/2009 | Hiyoshi et al. |
| 2009/0107464 A1 | 4/2009 | Berger |
| 2010/0006057 A1* | 1/2010 | Mendler .................. 123/196 R |
| 2010/0012095 A1 | 1/2010 | Wilkins |
| 2010/0132672 A1 | 6/2010 | Lee et al. |
| 2011/0023834 A1 | 2/2011 | von Mayenburg |
| 2011/0155106 A1 | 6/2011 | von Mayenburg |
| 2011/0192379 A1 | 8/2011 | von Mayenburg |
| 2012/0272931 A1 | 11/2012 | von Mayenburg |

FOREIGN PATENT DOCUMENTS

| | | |
|---|---|---|
| DE | 4103053 A1 | 8/1992 |
| DE | 19823980 A1 | 12/1999 |
| DE | 10211971 A1 | 10/2003 |
| DE | 102006015887 A1 | 10/2007 |
| EP | 2006509 | 12/2008 |
| JP | 02-147838 | 12/1990 |
| JP | 06-073339 | 10/1994 |
| JP | 2009209759 A | 9/2009 |
| WO | WO 01/40641 A1 | 6/2001 |
| WO | WO2004/015256 A1 | 2/2004 |
| WO | WO2004/053345 A1 | 6/2004 |
| WO | WO2005/059330 A2 | 6/2005 |
| WO | WO2006/092484 A1 | 9/2006 |
| WO | WO2009/002379 A1 | 12/2008 |
| WO | WO2011/090590 A1 | 7/2011 |
| WO | WO2011/090593 A1 | 7/2011 |

OTHER PUBLICATIONS

Office action dated Jan. 29, 2013, issued in U.S. Appl. No. 12/964,369, filed Dec. 9, 2010.

Office action dated Jul. 24, 2012, issued in U.S. Appl. No. 13/088,279, filed Apr. 15, 2011.

Office action dated Mar. 22, 2013, issued in U.S. Appl. No. 13/220,491, filed Aug. 29, 2011.

International Search Report and Written Opinion dated Dec. 10, 2008, issued in PCT Application No. PCT/US2008/005883, filed May 8, 2008.

International Search Report and Written Opinion dated Aug. 29, 2011, issued in PCT Application No. PCT/US2010/059921, filed Dec. 10, 2010.

International Search Report and Written Opinion dated Aug. 30, 2011, issued in PCT Application No. PCT/US2010/059950, filed Dec. 10, 2010.

* cited by examiner

CONNECTING ROD FORCE F
ENGINE 4000/MIN; 40% LOAD

1 INTAKE STROKE
2 COMPRESSION STROKE
3 WORKING STROKE
4 EXHAUST STROKE

FROM FIG. 4B

FROM FIG. 4B

FROM FIG. 4B

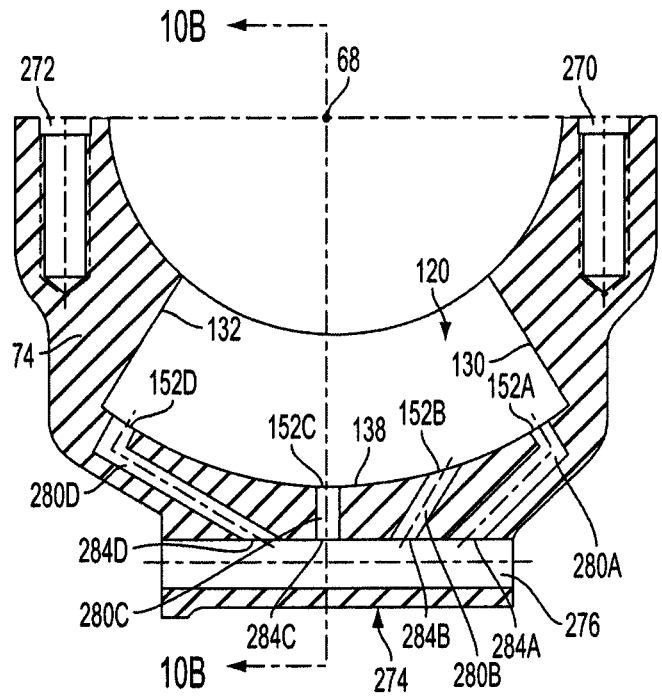
FIG. 10A
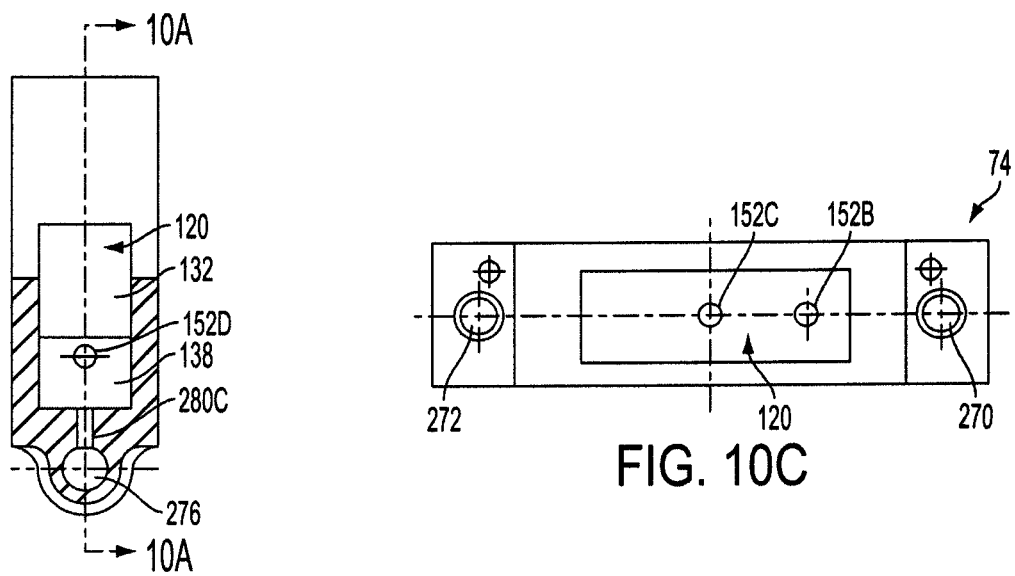
FIG. 10B
FIG. 10C

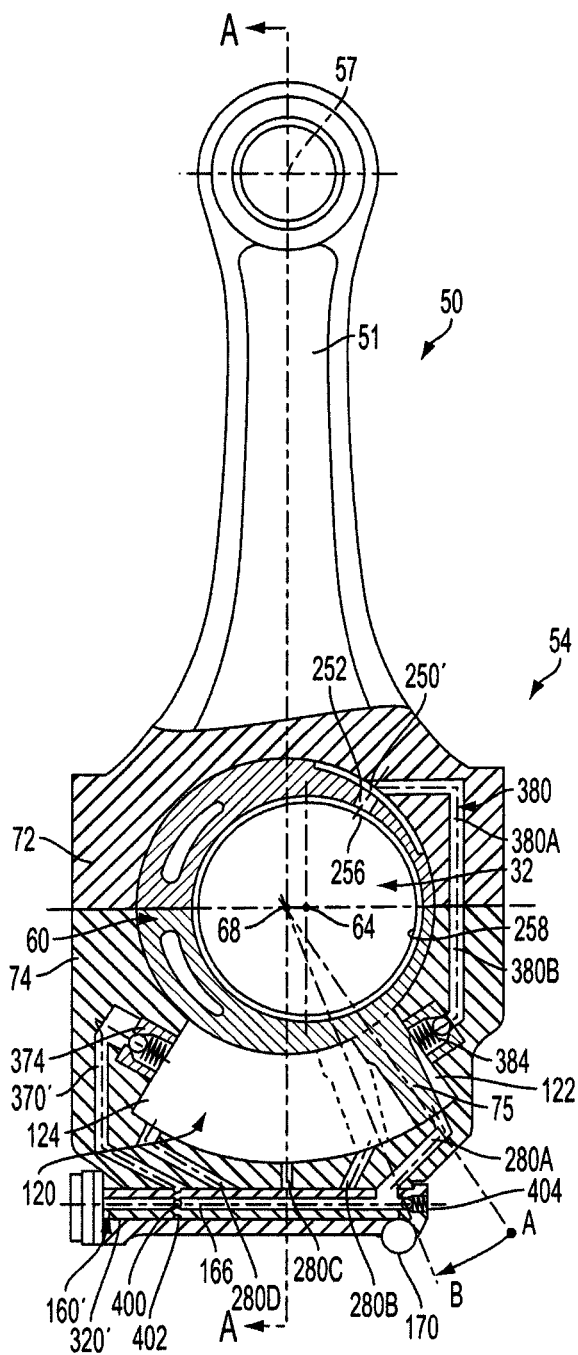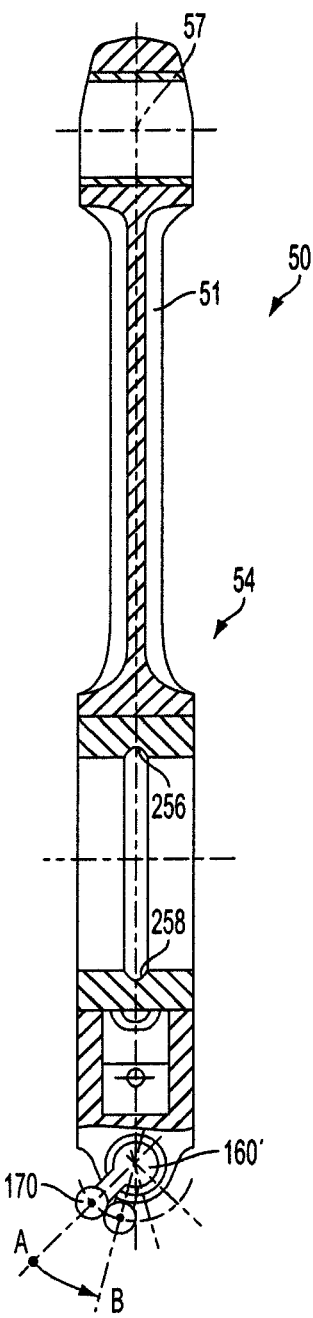
FIG. 20
FIG. 21

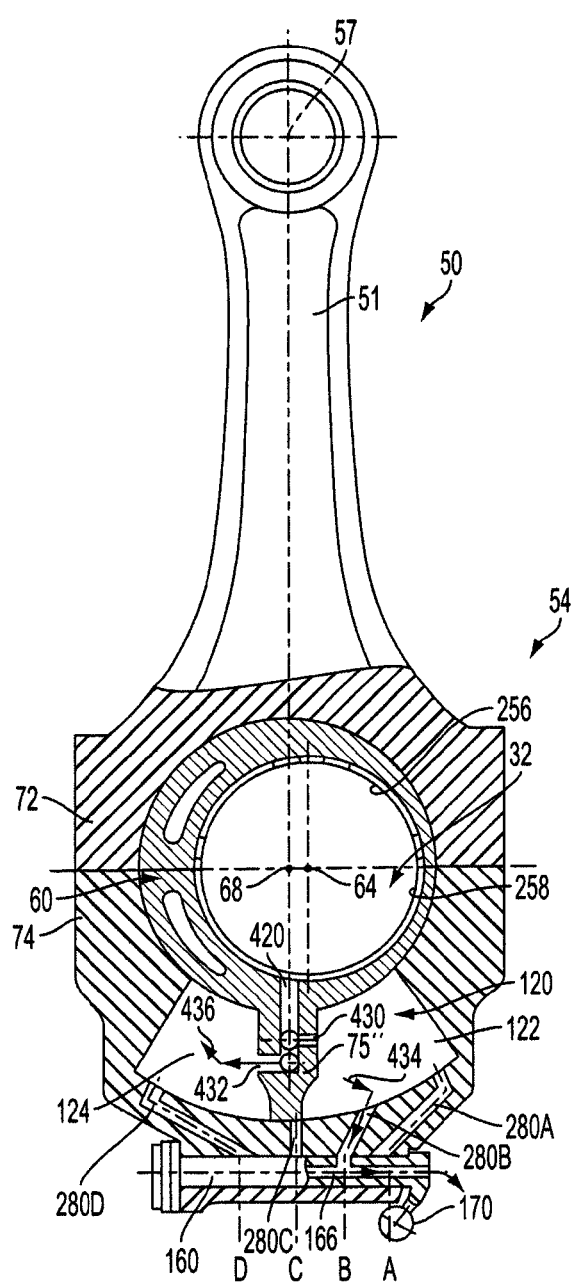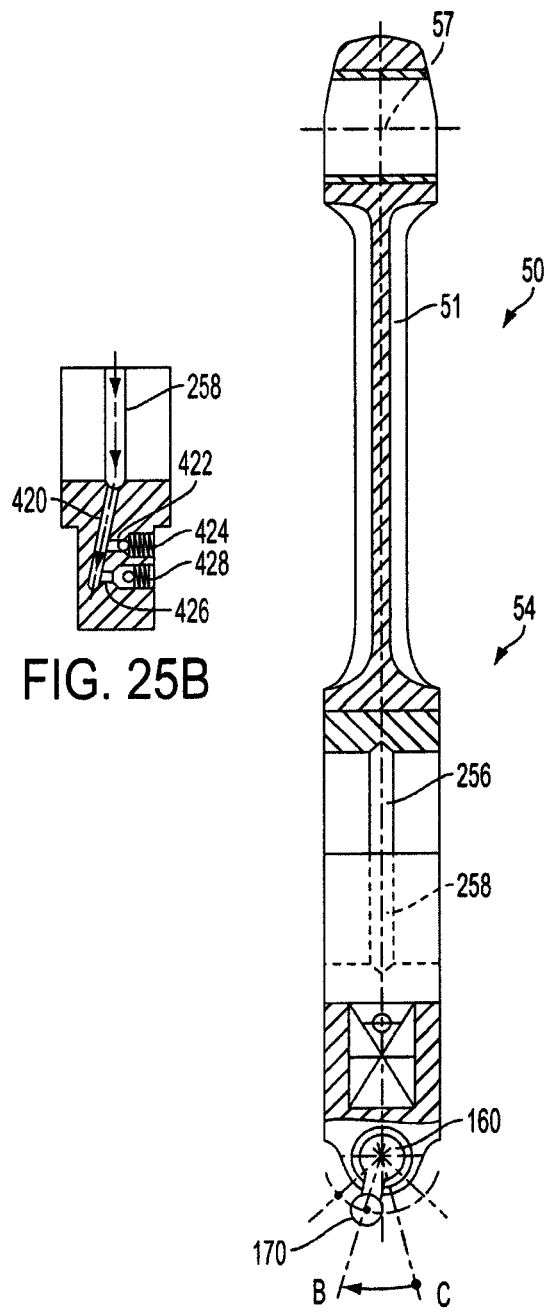
FIG. 25A
FIG. 25B
FIG. 26

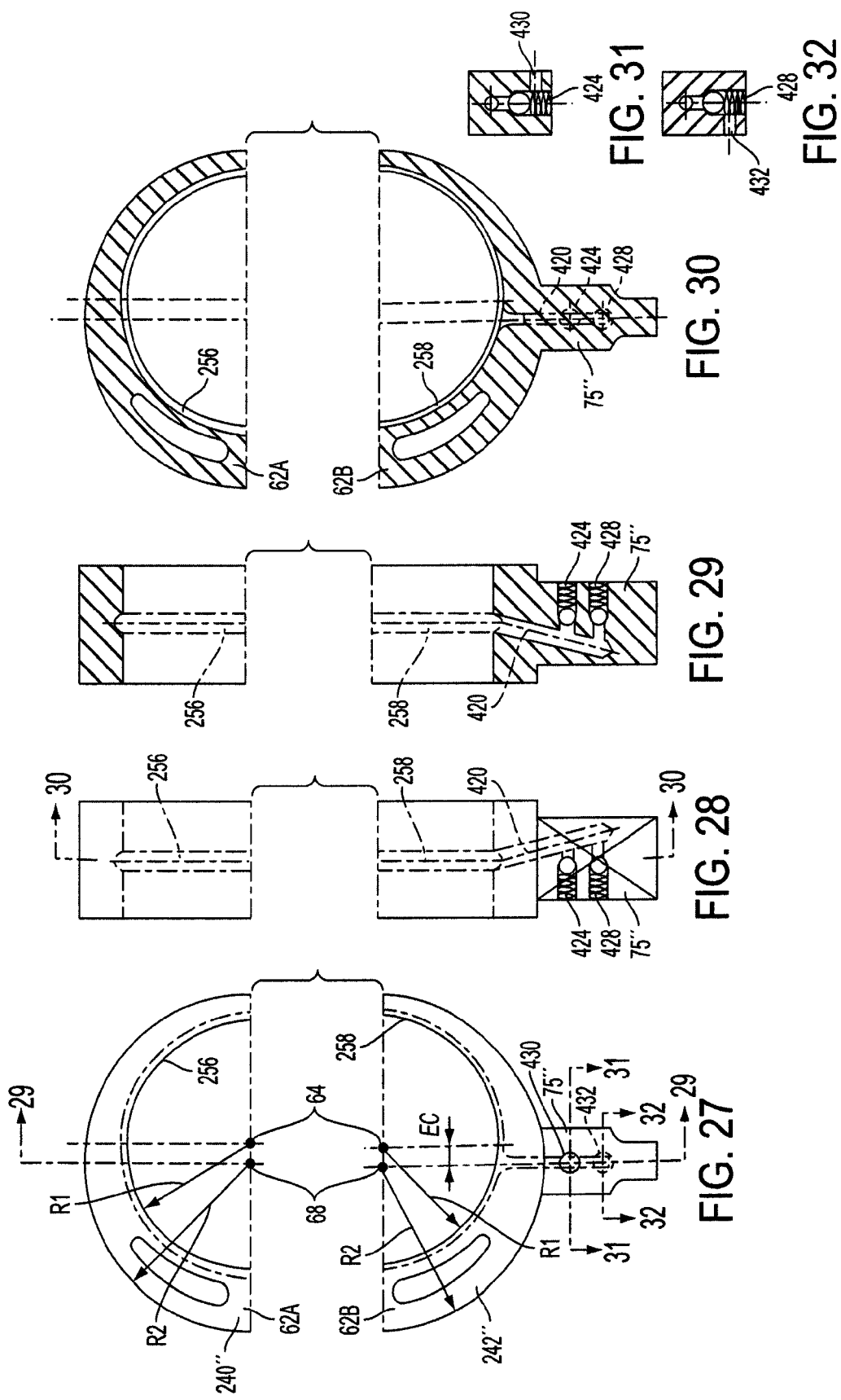

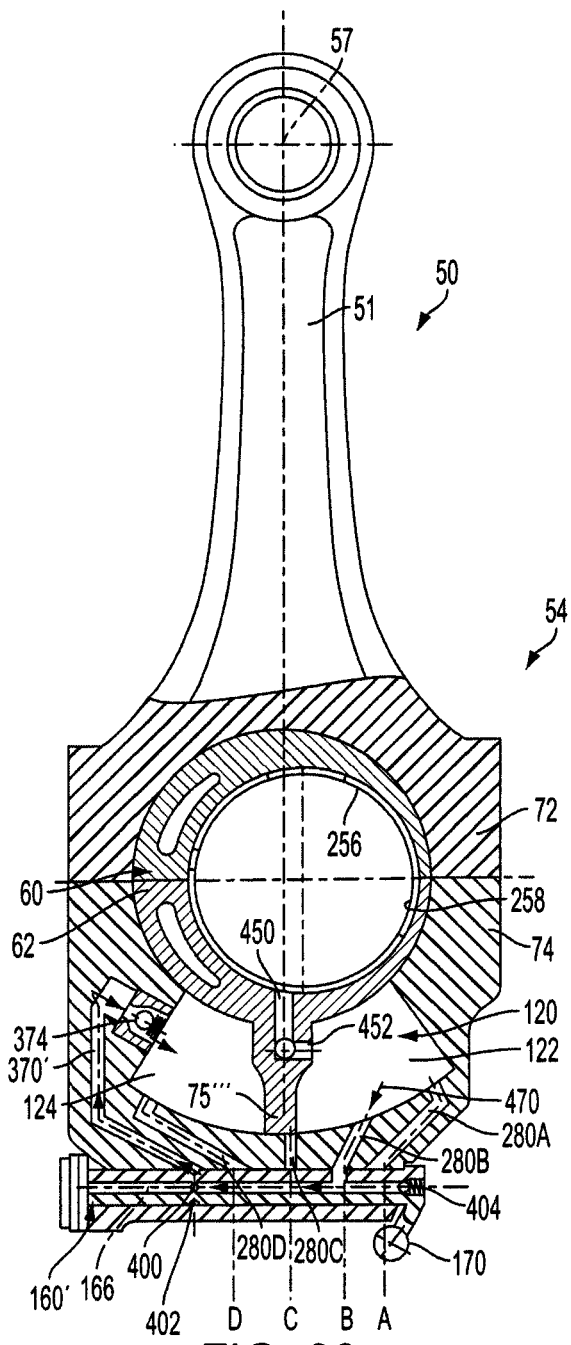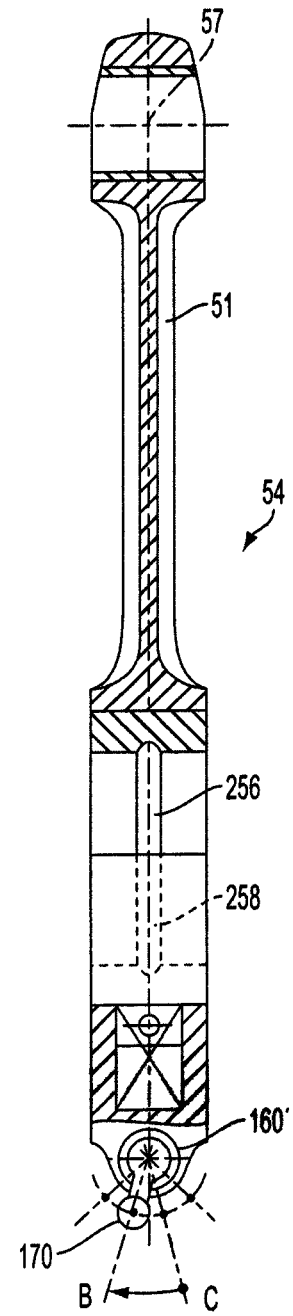
FIG. 33
FIG. 34

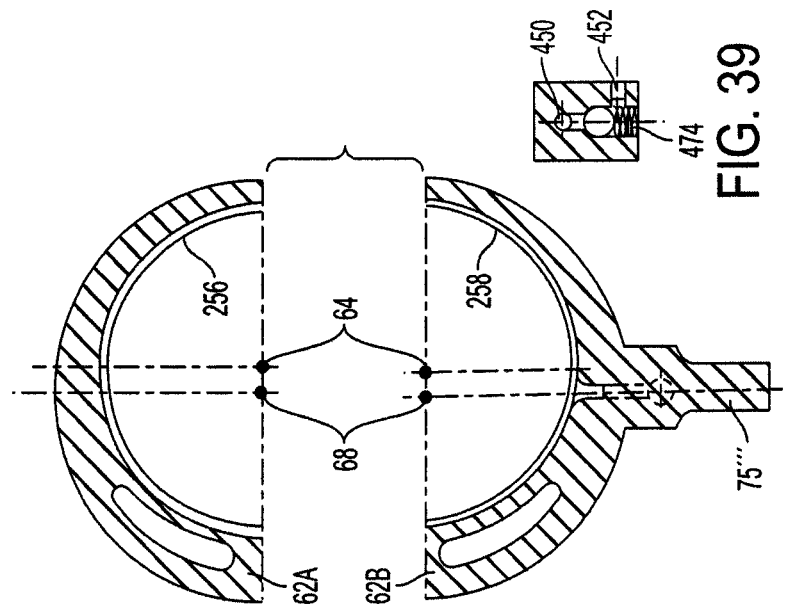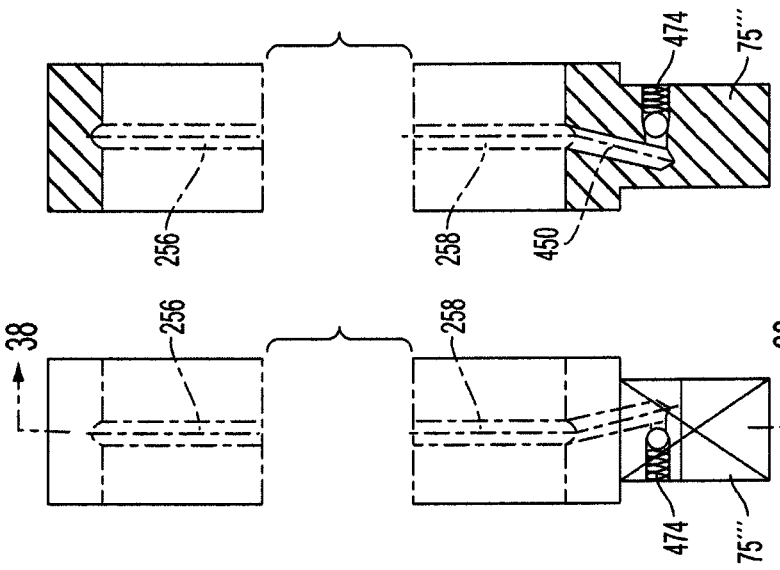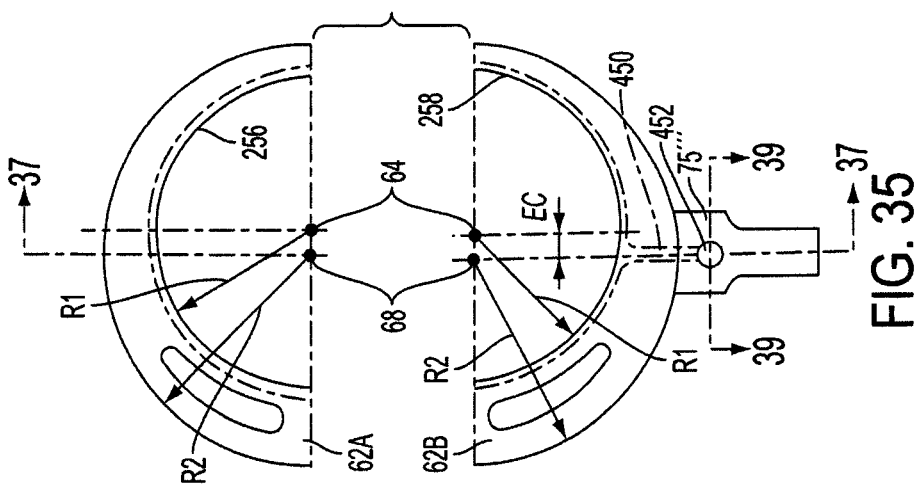

8,851,030 B2

COMBUSTION ENGINE WITH STEPWISE VARIABLE COMPRESSION RATIO (SVCR)

CROSS-REFERENCE TO RELATED APPLICATIONS

This application claims the benefit of U.S. Provisional Application No. 61/615,195, filed on Mar. 23, 2012, and also claims the benefit of U.S. Provisional Application No. 61/765,597, filed on Feb. 15, 2013.

FIELD

The technology disclosed herein relates to methods and apparatus for stepwise adjusting the compression ratio of an internal combustion engine, such as for gasoline and diesel fueled engines. More specifically, the technology relates to engines in which respective eccentric connecting rod bearings couple the one or more connecting rods of an engine to an engine crank shaft and wherein pivoting of the eccentric portions of the eccentric connecting rod bearings between selective positions of rotation, or steps, results in an adjustment of the compression ratio.

BACKGROUND

Gasoline fueled engines are typically designed so that under full load (open throttle) no uncontrolled combustion (knocking) occurs that limits the compression ratio. Under throttled conditions, the gasoline engine is under-compressed, which can reduce engine efficiency. Diesel fueled engines are typically over compressed to enhance starting in cold conditions. Diesel engines that have warmed up would be more efficient if they had a lower compression ratio. A need exists for an improved variable compression ratio engine and related methods.

SUMMARY

A stepwise variable compression ratio engine can be operated under various operating conditions to vary the engine compression so as to, for example, increase engine efficiency.

In accordance with one embodiment of this disclosure, an internal combustion engine comprises one or more connecting rod assemblies. Each such connecting rod assembly comprises a piston coupling end portion for pivotal coupling to a piston and a crank coupling end portion or connecting rod coupling portion for pivotal coupling to an associated connecting rod receiving crank shaft pin or connecting rod coupling portion of a crank shaft. An eccentric coupler, such as an eccentric connecting rod bearing assembly, couples the crank coupling end portion of the connecting rod assembly to the crank shaft pin. The eccentric coupler desirably comprises a projection extending into a projection receiving chamber defined by a section of the crank coupling end portion of the connecting rod assembly. The projection can take the form of a vane. Pivoting of the vane pivots the eccentric portion of the eccentric connecting rod bearing relative to the associated crank shaft pin to vary the compression ratio of the engine. Pivoting of the projection is accomplished in steps to vary the compression ratio in stepwise fashion between a plurality of predetermined steps. In accordance with this embodiment, a relatively mechanically simple and efficient mechanism is provided for pivoting the eccentric coupler projection to vary the compression ratio.

In accordance with another aspect of this embodiment, the projection receiving chamber is separated by the projection or vane into plural chamber sections. Liquid is admitted to a first chamber section and removed from a second chamber section to pivot the projection and thereby the eccentric coupler in a first direction. Conversely, the liquid is removed from the first chamber section and delivered to the second chamber section to pivot the projection and thereby the eccentric coupler in the opposite direction. Desirably the liquid is the engine lubricating fluid, such as oil.

In accordance with another aspect of this embodiment, the flow of liquid into and out of the respective chamber sections is interrupted in response to the projection reaching a selected position step to thereby adjust the position of the eccentric to a position corresponding to the selected position step at which the motion of the eccentric projection is interrupted.

In accordance with an aspect of an embodiment, a compression ratio adjuster is operable to selectively open an outlet passageway from a first chamber section of the chamber to permit the delivery of oil from the first chamber section of the chamber with oil being fed to the opposite or second chamber section of the chamber through an inlet passageway to thereby move the eccentric projection. Delivery of oil from the first chamber section of the chamber is halted by closing the outlet passageway. The compression ratio adjuster in one embodiment is positioned to be responsive to movement of a compression ratio adjuster guide.

The compression ratio adjuster guide can, in one exemplary form, comprise a funnel or slide positioned to adjust the position of the compression ratio adjuster in response to movement of the guide to thereby selectively open a selected one of plural outlet ports or passageways from a chamber section. In a specifically desirable approach, the guide is positioned to engage the compression ratio adjuster as the associated piston approaches or reaches its bottom dead center position, corresponding to a position where compression and tension forces in the connecting rod are relatively low. The position of the compression ratio adjuster is adjusted by the guide to open the selected passageway to permit fluid to flow from a chamber section through the selected passageway. The eccentric projection then moves toward the opened passageway until such time as the projection overlies and closes the selected passageway and blocks the further flow of liquid from the chamber section. Movement of the projection is then halted until a further adjustment of compression ratio is desired and the compression ratio adjuster guide controls the compression ratio adjuster to open another outlet passageway.

In accordance with an aspect of any one or more of the embodiments disclosed herein, the compression ratio (epsilon) can be stepwise varied in steps from low to high values within limits of the structural components of the system to allow greater control of the compression ratio. For example, the compression ratio epsilon of a diesel engine can be adjusted to be relatively high for good cold starting characteristics of the diesel engine and relatively low when the engine is warm. In one specific example, it is desirable for a diesel engine to have an epsilon value ranging from 17.5 during cold starting conditions to 14.5 when the engine is warm. In connection with a gasoline engine, it is desirable to have a relatively low compression ratio to avoid misfiring (knocking) at high engine loads, with a high compression ratio being more efficient at low engine loads. In one specific example, a turbocharged gasoline engine desirably can have a compression ratio or epsilon range from 8 to 14 for efficiency purposes. By adjusting the compression ratio, the firing pressure of diesel engines, which is about 200 bar with new engine designs, can be adjusted to a range that is close to 140 bar. A firing pressure close to 140 bar is close to the firing pressure seen in turbocharged gasoline internal combustion engines today. As a result, the designs of diesel and gasoline engines can be harmonized to have similar firing pressures at least under certain operating conditions.

Various aspects of embodiments of the developments set forth herein are summarized below. It is to be understood that the invention is not limited to embodiments that include all of the aspects set forth below as the invention encompasses all novel and non-obvious combinations and sub-combinations of these aspects as well as those found elsewhere in the description.

In accordance with aspects of one embodiment, a stepwise variable compression ratio internal combustion engine comprises: a crank shaft rotatable about a crank shaft axis and comprising a connecting rod coupling portion defining a first axis; at least one piston cylinder; and a piston slidably received by said at least one cylinder so as to reciprocate between top dead center and bottom dead center positions within said cylinder. In accordance with this embodiment, the crank coupling end portion comprises an eccentric adjuster receiving chamber. As a further aspect of this embodiment, a connecting rod comprises a piston coupling end portion pivotally coupled to the piston and a crank coupling end portion pivotally coupled to the connecting rod coupling portion of the crank shaft, such that rotation of the crank shaft causes the connecting rod to reciprocate and move the piston between top dead center and bottom dead center positions. In addition, a crank shaft coupler comprises an eccentric portion defining a second axis and operable to couple the connecting rod coupling portion of the crank shaft to the crank coupling end portion of the connecting rod, the eccentric portion being positioned such that pivoting of the crank shaft coupler about the first axis from one crank shaft coupler position to another crank shaft coupler position pivots the eccentric portion from a first eccentric position to a second eccentric position and shifts the second axis relative to the crank shaft axis to thereby vary the compression ratio of said at least one piston cylinder; the chamber in the crank coupling end portion of the connecting rod comprises a plurality of spaced apart outlet ports. Also, a projection coupled is to the crank shaft coupler such that movement of the projection pivots the crank shaft coupler about the first axis, the projection positioned at least partially within the chamber and being shaped to separate the chamber into first and second chamber sections, the projection being selectively movable between plural positions, wherein in each position a respective outlet port is closed by the projection. As yet another aspect of this embodiment, a first passageway communicates with the first section of the chamber, and a first valve allows one-way liquid flow through the first passageway into the first section of the chamber. In addition, a second passageway communicates with the second section of the chamber, and a second valve allows one-way liquid flow through the second passageway into the second section of the chamber. As yet another aspect of this embodiment, a compression ratio adjuster is operable to selectively open a selected first of the outlet ports so as to permit liquid flow from the one of the first and second sections of the chamber in communication with the first outlet port through the first outlet port, and wherein liquid flow through one of the first and second passageways and into the other of the first and second sections of the chamber other than said one of the first and second sections of the chamber in communication with the first outlet port. This results in the projection moving from a first projection position in a direction toward the first outlet port and to a second projection position closing the first outlet port with liquid in the respective first and second chambers assisting in maintaining the projection in the second projection position. Also, the compression ratio adjuster is operable to selectively open a selected second of the outlet ports other than the first outlet port to permit liquid flow from the one of the first and second sections of the chamber in communication with the second outlet port through the second outlet port and wherein liquid flows through one of the first and second passageways and into the other of the first and second sections of the chamber other than said one of the first and second sections of the chamber in communication with the second outlet port. As a result, the projection moves from the second projection position in a direction toward the second outlet port and to a third projection position closing the second outlet port with liquid in the first and second sections of the chamber assisting in maintaining the projection in the third projection position. The movement of the projection moves the crank shaft coupler and varies the compression ratio of said at least one piston cylinder in steps defined by the positions to which the projection moves in response to opening the selected outlet ports.

In the above embodiment, the first and third projection positions can be the same (if the projection is returning back to the first position from the second position, or the positions can be different. In one desirable embodiment, there are at least four of said outlet ports each corresponding to a position to which the projection is movable.

In accordance with an aspect of an embodiment, the first and second liquid passageways can communicate with the respective first and second sections of the chamber at locations spaced from the projection. In an alternative form, at least one of the first and second liquid passageways communicates with a respective one of the first and second sections of the chamber through the projection. In accordance with yet another aspect of an embodiment, the first fluid passageway can communicate with the first chamber section through the projection and the second fluid passageway can communicate with the second chamber section through the projection.

As another aspect of an embodiment, the chamber can comprise an arcuate base portion having a radius with a center on the second axis. In addition, the projection can comprise a vane pivotable about the second axis and comprising a distal end portion slidable along the base portion of the chamber. The outlet ports can communicate through the base portion of the chamber at spaced apart locations along the base portion of the chamber. In an aspect of this embodiment, the vane can be selectively movable to positions overlying and closing selected outlet ports that have been opened by the compression ratio adjuster to thereby vary the compression ratio of said at least one piston cylinder.

As still further aspects, the engine can comprise an oil pump operable to pump oil under pressure, a space existing between the crank shaft and crank shaft coupler, an oil port communicating from said space to an elongated gap that extends circumferentially about a portion of the crank shaft coupler at a location spaced from the projection, the first and second fluid passageways communicating with the gap, oil under pressure from the oil pump being delivered to the gap and from the gap to the first and second fluid passageways.

In accordance with additional aspects of an embodiment, the crank shaft coupler can comprise first and second eccentric shell portions, at least a major portion of the second eccentric shell portion being spaced further from the piston than the first eccentric shell portion, and wherein the projection extends outwardly from the second eccentric shell portion. Also, the projection can comprises an integral unitary monolithic portion of the second eccentric shell portion.

As still further aspects of an embodiment, the first eccentric shell portion comprises a first crank shaft bearing surface positioned to pivot in contact with the connecting rod coupling portion of the crank shaft and a first connecting rod bearing surface positioned to pivot in contact with the crank coupling end portion of the connecting rod. In addition, the second eccentric shell portion comprises a second crank shaft bearing surface positioned to pivot in contact with the connecting rod coupling portion of the crank shaft and a second connecting rod bearing surface positioned to pivot in contact with the crank coupling end portion of the connecting rod. In accordance with an aspect of an embodiment, the average coefficient of friction of the first connecting rod bearing surface is less than the average coefficient of friction of the second connecting rod bearing surface. In addition, the first and second crank shaft bearing surfaces can comprise a bearing material, the first connecting rod bearing surface can comprise bearing material, and the second connecting rod bearing surface can comprise a material having a higher coefficient of friction than the coefficient of friction of the bearing material.

In accordance with yet another aspect of an embodiment, the crank coupling end portion can comprise first and second crank coupling sections, the first crank coupling section being nearer to the piston than the second crank coupling section, at least a major portion of the chamber being located in the second crank coupling section, and the first and second crank coupling sections being detachably fastened together.

In accordance with additional aspects of an embodiment, the compression ratio adjuster can comprise a control drum pivoted to the connecting rod coupling portion, the control drum comprising an outlet passageway and a plurality of inlet ports each in communication with the outlet passageway, the inlet ports being spaced apart along the length of the control drum and having respective openings at different rotational positions at the surface of the control drum, each inlet port being associated with a respective one of the chamber outlet ports, the control drum being selectively pivotable to plural rotational positions, wherein at each such rotational position a respective inlet port and associated outlet port communicate with one another to provide a fluid passageway from the first or second chamber section of the chamber to which the outlet port communicates.

As another aspect of an embodiment, a pressure valve can be positioned in the control drum outlet passageway.

As an additional aspect of an embodiment, the engine can comprise throttling openings or passageways through which liquid flows from the chamber sections. The throttling of liquid flow assists in controlling the rate of movement of a vane or projection in the chamber between positions. For example, the inlet ports to the drum passageway, and/or the drum passageway can be sized to act as throttling ports or passageways for liquid flow from the chamber sections.

Alternatively, one or more of the outlet ports, passageways, or exit openings from the passageways from the chamber sections can be sized to function as throttling ports instead of, or in addition to, sizing the bores and/or inlet ports of the control drum.

As yet another aspect of an embodiment, the internal combustion engine can comprise an oil pump operable to pump oil under pressure, the oil under pressure being delivered to the first of said first and second passageways, the first passageway communicating with the chamber section from which liquid is removed when the projection moves toward a lower engine compression ratio position, the internal combustion engine further comprising a pressure valve in the control drum outlet passageway operable to establish the pressure in the control drum outlet passageway at a level that is less than the pressure in the first passageway of the oil under pressure from the oil pump when the oil is not flowing through the first one way valve. In one example, the pressure in the control drum outlet passageway is less than one half of the pressure in the first passageway when the first one way valve is closed and the oil pump is operating to pump oil under pressure.

As a further aspect of an embodiment, the one way valves can comprise check valves.

As still another aspect of an embodiment, the first passageway can communicate through the projection to the first chamber section, the first chamber section being positioned at the side of the projection in the direction in which the projection moves to reduce the combustion ratio of the internal combustion engine, the first one way valve being positioned in the first passageway and being carried by the projection. As another aspect of this embodiment, the internal combustion engine can comprise a bypass passageway through which the second passageway communicates with the first chamber section when an outlet port communicating with the first chamber section is open, the bypass passageway comprising a liquid outlet and a pressure valve adjacent to the liquid outlet operable to establish a threshold pressure that would have to be exceeded in the bypass passageway for liquid to flow through the liquid outlet. As a further aspect of this embodiment, the compression ratio adjuster can comprise a control drum pivoted to the connecting rod coupling portion, the control drum can comprise a control drum outlet passageway and a plurality of inlet ports each in communication with the outlet passageway, the inlet ports being spaced apart along the length of the control drum and having respective openings at different rotational positions at the surface of the control drum, each inlet port being associated with a respective one of the chamber outlet ports, the control drum being selectively pivotable to plural rotational positions, wherein at each such rotational position a respective inlet port and associated outlet port communicate with one another to provide a fluid passageway from the first or second chamber section of the chamber to which the outlet port communicates, wherein the control drum outlet passageway comprises the bypass passageway, wherein the second passageway communicates with the first chamber section through the control drum outlet passageway. Also, the internal combustion engine can comprise an oil pump operable to pump oil under pressure, the oil under pressure being delivered to the first passageway, the pressure valve being operable to establish a pressure in the control drum outlet passageway at a level that is less than the pressure in the first passageway when oil is not flowing through the first one way valve and the oil pump is operating to pump oil under pressure to the first passageway.

In accordance with further aspects of an embodiment, the control drum can pivot about a longitudinal control drum axis to the plural rotational positions, the longitudinal control drum axis being perpendicular to the crank shaft axis, the control drum comprising a drum position adjuster projecting away from the longitudinal axis of the control drum and away from the chamber, a drum position adjuster engager movable in respective directions parallel to the crank shaft axis to selected engagement positions each of said engagement positions corresponding to a respective variable compression ratio step, the drum position adjuster engager being positioned to engage the drum position adjuster as the piston approaches the bottom dead center position to pivot the drum position adjuster to pivot the control drum from one of said rotational positions to another of said rotational positions in response to movement of the drum position engager from one of said selected engagement positions to another of said selected engagement positions, whereupon the compression ratio is adjusted from one compression ratio step to another compression ratio step.

As yet additional aspects of an embodiment, the control drum adjuster engager can comprise a guide that opens toward the control drum adjuster, the guide comprising respective side walls that engage the drum position adjuster as the piston approaches the bottom dead center position, the guide being configured to move the drum position adjuster from one position to another position to thereby move the control drum from one rotational position to another rotational position in response to movement of the control drum adjuster engager from one selected engagement position to another selected engagement position.

As still further aspects of an embodiment, the control drum adjuster engager can comprise a base with converging side walls that engage the drum position adjuster as the piston approaches the bottom dead center position so as to move the drum position adjuster from one position to another position and thereby move the control drum from one rotational position to another rotational position in response to movement of the control drum adjuster engager from one selected engagement position to another selected engagement position. As another aspect of an embodiment, the internal combustion engine can comprise an oil pan positioned below the crank shaft and the drum position adjuster can be positioned adjacent to the oil pan.

As further aspects of an embodiment, the compression ratio adjuster can comprise an adjustable friction brake coupled to the control drum and operable to adjust the resistance of the control drum to rotation relative to the connecting rod coupling portion. Also, the control drum can have a length that is less than the width of the second section of the crank coupling end portion in a direction perpendicular to the longitudinal axis of the connecting rod when the piston is in the bottom dead center position. Furthermore, the drum position adjuster can comprise a projection extending from one end of the control drum at an acute angle of from 12 degrees to twenty eight degrees from the longitudinal axis of the control drum.

As an additional aspect of an embodiment the forces on the connecting rod vary between compression and tension forces as a piston moves from a bottom dead center position to a top dead center position and back to a bottom dead center position. In accordance with this aspect, the eccentric portion is positioned at the side of the first axis that results in the eccentric torque opposing both a bearing torque and a holding torque at least when the forces on the connecting rod are in compression.

As yet another aspect of an embodiment, the eccentric portion has a portion of maximum eccentricity and the connecting rod coupling portion of the crank shaft comprises a crank pin having a center line aligned with the first axis. In accordance with this aspect, for an internal combustion engine of a design in which the crank shaft rotates in a clockwise direction, when looking in a direction along the first axis from a position outside of the crank shaft coupler toward the crank shaft coupler, the portion of maximum eccentricity of the eccentric portion is positioned at the left side of the center line of the crank shaft pin. Also, for an internal combustion engine of a design in which the crank shaft rotates in a counter-clockwise direction, when looking in a direction along the first axis from a position outside of the crank shaft coupler toward the crank shaft coupler, the portion of the maximum eccentricity of the eccentric portion is positioned at the right side of the center line of the crank shaft pin.

In accordance with further aspects of an embodiment, wherein the first and second valves are closed upon movement of the projection to a position closing the chamber section outlet port that was opened to allow movement of the projection, and such that while the outlet ports remain closed, liquid in the chamber sections maintain the projection in the position to which it has been moved.

In accordance with further aspects of an embodiment, the projection is pivoted toward an outlet port to be closed in either a clockwise or counter-clockwise direction depending upon the relative positions of the vane and outlet port to be closed. In addition, an eccentric bearing torque TEC is applied to the vane in respective clockwise and counter-clockwise directions as the piston moves from a top dead center position, to a bottom dead center position and back to the top dead center position. Wherein the torque TEC, during times that TEC is applied in the direction in which the projection is being pivoted to close an outlet port, moves the vane toward the open outlet port.

In accordance with an embodiment, the one of the first and second chamber sections toward which the projection is moved to increase the compression ratio can be at a lower pressure than the pressure in the other of the first and second chamber sections when the internal combustion engine is running.

In accordance with aspects of embodiments of a stepwise variable compression ratio internal combustion engine, the engine can comprise, in addition to other aspects, means for delivering liquid to a chamber at one side of a projection and for removing liquid from the chamber at the other side of the projection to pivot a crank shaft coupler in a first direction to adjust the compression ratio, and means for delivering liquid to said other side of the projection and for removing liquid from the said one side of the projection to pivot the crank shaft coupler in a second direction opposite to the first direction to adjust the compression ratio.

In accordance with still further aspects of an embodiment, an eccentric crank shaft coupler is disclosed for a stepwise variable compression ratio internal combustion engine. The eccentric crank shaft coupler is provided for coupling a crank shaft pin to a connecting rod. The eccentric crank shaft coupler comprises: first and second eccentric shell portions that together define an eccentric and an internal right cylindrical surface for coupling to the crank shaft pin and an external right cylindrical exterior surface for coupling to a connecting rod thereto, at least a major portion of the second eccentric shell portion being spaced further from the connecting rod than the first eccentric shell portion, the first and second right cylindrical surfaces having centers that are offset from one another, the offset corresponding to the eccentricity of the eccentric; and a vane projecting outwardly from the second eccentric shell portion and coupled to the second eccentric shell portion such that movement of the vane in a first direction rotates the eccentric in a first direction about the crank shaft pin to adjust the compression ration of the engine and rotation of the vane in a second direction rotates the eccentric about the crank shaft pin in a second direction opposite to the first direction to adjust the compression ratio of the engine.

As a further aspect of an eccentric crank shaft coupler, the first shell can comprise a first crank shaft bearing surface slidably coupled to the crank shaft pin and a first connecting rod bearing surface slidably coupled to the connecting rod. In addition, the second eccentric shell portion can comprise a second crank shaft bearing surface slidably coupled to the crank shaft pin and a second connecting rod bearing surface slidably coupled to the connecting rod. Also, the average coefficient of friction of the first connecting rod bearing surface can be less than the average coefficient of friction of the second connecting rod bearing surface.

As other aspects of an eccentric crank shaft coupler, the eccentric crank shaft coupler can comprise at least one liquid flow vane passageway extending through the vane. In addition, the second of the eccentric shells can define a liquid flow passageway communicating with the vane passageway. Furthermore, in accordance with an aspect of an embodiment, an eccentric coupler can comprise a the vane that comprises first and second side surfaces and the at least one vane passageway can extend outwardly through one of the side surfaces of the vane. As yet another aspect, the vane can comprise at least one vane passageway extending outwardly through the first side surface of the vane and at least one vane passageway extending outwardly through the second side surface of the vane.

In accordance with an embodiment of a connecting rod assembly for a stepwise variable compression ratio internal combustion engine, the connecting rod assembly can comprise a connecting rod comprising a piston coupling end portion and a crank coupling end portion, the crank coupling end portion comprising a projection receiving chamber that comprises a plurality of spaced apart outlet ports.

As an aspect of an embodiment, a connecting rod assembly can comprise a compression ratio adjuster rotatable between selectable positions each of such positions corresponding to a position that provides a liquid flow path through one of the outlet ports of the chamber and into the compression ratio adjuster. As further aspects, the compression ratio adjuster can comprise a drum having an internal flow passageway with a plurality of spaced apart inlet ports each communicating with the internal flow passageway, the inlet ports being positioned at different positions about the longitudinal axis of the compression ratio adjuster such that rotation of the compression ratio adjuster positions a selected one of the outlet ports in communication with an associated chamber outlet port to provide a liquid flow path through the associated and communicating inlet and outlet ports. Also, the chamber can comprises an arcuate base portion having a radius and wherein the outlet ports communicate through the base portion of the chamber.

In accordance with additional aspects, a connecting rod assembly is provided for coupling to a crank pin having a first axis and to an associated piston and piston cylinder, the connecting rod assembly comprising an eccentric crank shaft coupler defining a second axis and operable to couple the connecting rod coupling portion of the crank shaft to the crank coupling end portion of the connecting rod, the eccentric portion coupler comprising an eccentric positioned such that pivoting of the crank shaft coupler about the second axis from one crank shaft coupler position to another crank shaft coupler position pivots the eccentric portion from a first eccentric position to a second eccentric position and shifts the second axis relative to the first axis to thereby vary the compression ratio of the associated piston cylinder, the eccentric crank shaft coupler comprising first and second eccentric shell portions, a projection extending from one of the first and second eccentric shell portions and into a projection receiving chamber, the chamber comprising a base portion through which the outlet port's communicate, the projection comprising a vane pivotable about the second axis, the vane comprising a distal end portion slidable along the base portion of the chamber, the vane being selectively movable to positions overlying and closing outlet ports that have been opened by the compression ratio adjuster to thereby vary the compression ratio of the associated piston cylinder.

In accordance with one embodiment of a method of adjusting the compression ratio of an internal compression engine, the method comprises: delivering liquid to a first side of a projection within a chamber and removing liquid from a second side of the projection to pivot the projection in the chamber in a first direction; delivering liquid to the second side of the projection and removing liquid from the first side of the projection to pivot the projection in the chamber in a second direction opposite to the first direction; pivoting an eccentric connecting rod bearing in respective first and second directions in response to pivoting of the projection in the first and second directions to adjust the compression ratio of the internal combustion engine, the compression ratio of the engine corresponding to the position to which the eccentric connecting rod bearing is pivoted; and interrupting the pivoting of the projection upon the projection reaching a selected position.

Stepwise adjustable compression ratio engines as disclosed herein can be operated to improve the efficiency of internal combustion engines by varying the compression ratio appropriately between selected steps.

BRIEF DESCRIPTION OF THE DRAWINGS

FIG. 10A is a vertical sectional view through an exemplary lower section of a crank shaft coupling portion of a connecting rod assembly.

FIG. 10B is a vertical sectional view of the crank shaft coupling portion of FIG. 10A, taken along line 10B-10B of FIG. 10A.

FIG. 10C is a top plan view of the connecting rod section of FIG. 10A.

FIG. 18B showing the movement of the projecting portion of the control drum resulting from shifting of the drum position adjuster engager in one direction; and FIG. 18C illustrating the movement of the projecting portion of the control drum resulting from shifting of the drum position adjuster engager in a direction opposite to the direction shown in FIG. 18B.

FIG. 20 is a front view, partially in section, of an alternative form of connecting rod assembly illustrating another approach for delivering oil to and removing oil from chamber sections on opposite sides of a projection of an eccentric coupler.

FIG. 21 is a vertical sectional view of the connecting rod assembly of FIG. 20, taken in a direction perpendicular to the direction shown in FIG. 20.

FIG. 25A is a front view, partially in section, of an alternative form of connecting rod assembly illustrating yet another approach for delivering oil to and removing oil from chamber sections on opposite sides of a projection of an eccentric coupler.

FIG. 25B illustrates an exemplary form of valving that can be used to control the flow of oil into respective chamber sections of the embodiment of FIG. 25A.

FIG. 26 is a vertical sectional view of the connecting rod assembly of FIG. 25A, taken in a direction perpendicular to the direction shown in FIG. 25A.

FIG. 27 illustrates a front view of an alternative form of eccentric coupler to the form shown in FIG. 9.

FIG. 28 is a side elevational view of the eccentric coupler of FIG. 27.

FIG. 29 is a vertical sectional view through the eccentric coupler of FIG. 27, taken along line 29-29 of FIG. 27.

FIG. 30 is a vertical sectional view through the eccentric coupler of FIG. 28, taken along line 30-30 of FIG. 28.

FIG. 31 is a sectional view, taken along line 31-31 of FIG. 27, illustrating an exemplary valve for controlling the flow of lubricant into one of the chamber sections.

FIG. 32 is a sectional view, taken along line 32-32 of FIG. 27, illustrating an exemplary valve for controlling the flow of lubricant into the other of the chamber sections.

FIG. 33 is a front view of a connecting rod assembly embodiment illustrating a still further approach for delivering lubricating oil to and from respective chamber sections on opposite sides of a projection of an eccentric coupler.

FIG. 34 is a vertical sectional view of the connecting rod assembly of FIG. 33, taken in a direction perpendicular to the direction shown in FIG. 33.

FIG. 35 is a front view of another form of eccentric coupler that is another alternative to the form illustrated in FIG. 9.

FIG. 36 is a side elevational view of the eccentric coupler of FIG. 35.

FIG. 37 is a vertical sectional view, taken along line 37-37 of FIG. 35, of the eccentric coupler of FIG. 35.

FIG. 38 is a vertical sectional view of the eccentric coupler of FIG. 36, taken along line 38-38 of FIG. 36.

FIG. 39 is a sectional view, taken along line 39-39 of FIG. 35, illustrating exemplary valving that can be used to control the flow of lubricant to one of the chambers at one side of a projection of the eccentric coupler.

DETAILED DESCRIPTION

The invention encompasses all novel and non-obvious assemblies, subassemblies and individual elements, as well as novel and non-obvious combinations and sub-combinations of method acts that are disclosed herein. The embodiments described below to illustrate the developments are examples only, as the invention is defined by the claims set forth below. Also, in this disclosure, the term "coupled" and "coupling" encompasses both a direct connection of elements and an indirect coupling of elements through or by one or more other elements. Also, the terms "a" and "an" encompass both the singular and the plural. For example, if "an" element or "a" element is referred to, this includes one or more of such elements. Thus, for example, if a plurality of specific elements of one type is present, there is also "an" element of the type described. The invention is also not limited to a construction which contains all of the features described herein. In this disclosure, the term "and/or" means "and", "or" and both "and" and "or". In connection with a list of items, "and/or" means the items individually, all of the items collectively, and all possible combinations of the listed items.

Figure 1:
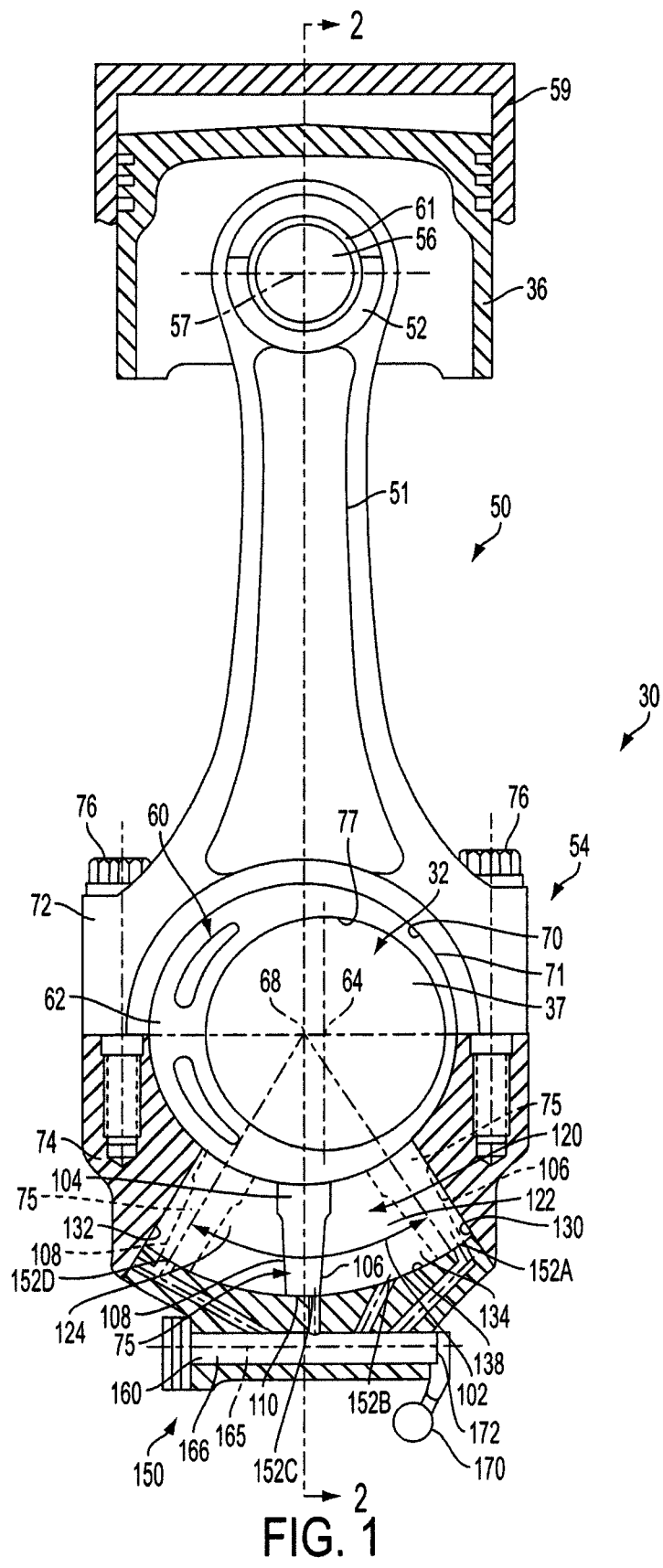
FIG. 1 is a front view, partially in section, of one embodiment of a piston rod assembly for a stepwise variable compression ratio internal combustion engine.
Figure 2:
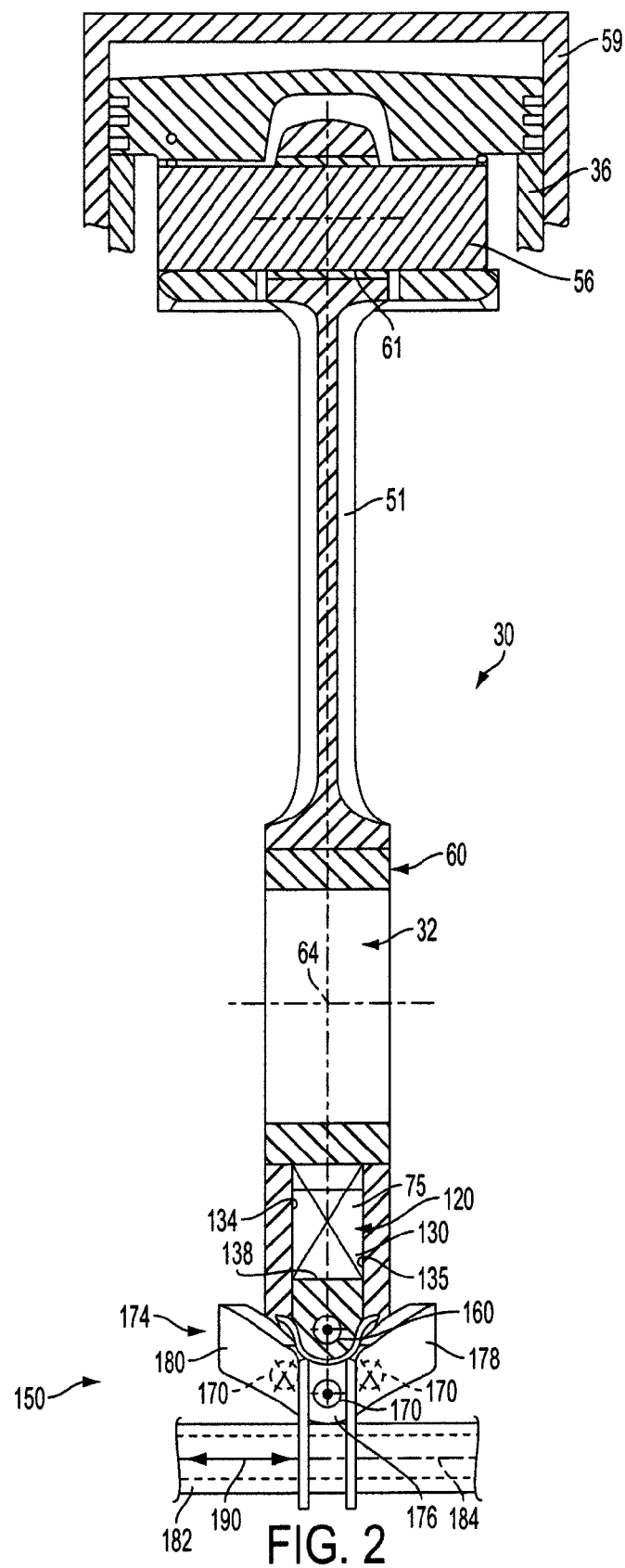
FIG. 2 is a vertical sectional view of the assembly of FIG. 1, taken along lines 2-2 of FIG. 1, together with components of an exemplary form of a compression ratio adjuster that is not shown in FIG. 1.

FIGS. 1 and 2 are views of a portion of an embodiment of a stepwise variable compression ratio internal combustion engine, with only one cylinder of the engine being shown in FIG. 1. The engine 30 comprises a portion of an engine block (not shown) that pivotally supports a crank shaft 32 for rotation about a crank shaft axis (not shown in FIG. 1, but indicated at 34 in FIG. 40). Typically, various bearings or bushings couple the crank shaft to an engine housing. The technological developments disclosed herein are not limited to engines with a specific number of cylinders as engines with at least one to any number of cylinders can utilize the technology. Engines disclosed herein can be used in a wide variety of applications, such as in land vehicles.

In FIGS. 1 and 2, a piston 36 is shown in a top dead center position. Since each of the pistons and associated engine components can be identical, like numbers are assigned to like or similar components for the various pistons and engine components throughout this disclosure. Thus, with reference to FIGS. 1 and 2, the crank shaft 32 comprises a connecting rod coupling portion such as a connecting rod pin portion 37 with one such crank shaft pin portion 37 being provided for each of the connecting rods included in the engine. A connecting rod assembly 50 is shown comprising a connecting rod 51, with an upper piston coupling end portion 52 for pivotal coupling by a piston pin 56 to the piston 36 for pivoting about a piston pivot axis 57. The piston 36 is slidably received by and reciprocates within a piston cylinder 59 between top dead center and bottom dead center positions as the crank shaft 32 is rotated. Bearings or bushings, such as indicated at 61 in FIG. 1, can be used to couple the piston pin 56 to the connecting rod end portion 52. Typically, piston rings, (not shown in FIGS. 1 and 2), are positioned within piston ring receiving grooves and slide in contact with the interior surface of the piston cylinder 59 to protect the cylinder against scoring by the piston and to provide a suitable seal at this location.

In the illustrated embodiment of FIGS. 1 and 2, a crank coupling end portion 54 of the connecting rod assembly is located at the opposite end of connecting rod 51 from end portion 52. Crank coupling end portion 54 is pivotally coupled to the connecting rod coupling portion 32 of the crank shaft utilizing a crank shaft coupler with an eccentric such as explained below. Rotation of the crank shaft causes the connecting rod to reciprocate and move the piston between top dead center and bottom dead center positions. In the embodiment of FIGS. 1 and 2, an exemplary crank shaft coupler comprises an eccentric connecting rod bearing indicated at 60 with an eccentric portion indicated at 62.

The connecting rod coupling portion or crank shaft pin 37 defines a first axis 64 that is parallel to the crank shaft axis 34 (FIG. 40) and positioned at the longitudinal center of the connecting rod pin portion 37 of the crank shaft. The eccentric portion 62 of the eccentric connecting rod bearing 60 defines a second longitudinal axis 68 (FIG. 1) parallel to and offset from the first axis 64. With this construction, pivoting of the crank shaft connecting rod bearing 60, and thereby the eccentric portion 62, about the axis 64 from a first position to a second position pivots the eccentric portion 62 from a first eccentric position to a second eccentric position. This movement of the eccentric portion 62 shifts the second axis 68 relative to the crank shaft axis 34 (FIG. 40) to thereby vary the compression ratio of the associated piston cylinder. The same adjustment can be made to the eccentric portion of each crank shaft connecting bearing of an engine so that the compression ratio of each of the piston cylinders of an engine is varied together. It is to be understood that, in a desirable construction, the position of eccentric portion 62 can be varied in steps to thereby vary the compression ratio in a plurality of steps from a low epsilon to a high epsilon and back. As explained below, the eccentric coupler, in this example an eccentric connecting rod bearing 60, desirably comprises a projection that can be moved, as explained below, by a compression ratio adjuster between desired predetermined positions or steps to adjust the compression ratio in a stepwise manner. One form of projection comprises a vane 75 as shown in FIG. 1.

In the embodiment illustrated in FIGS. 1 and 2, the crank coupling end portion 54 of the connecting rod 50 defines an eccentric connecting rod bearing receiving bore 70 that pivotally receives the eccentric connecting rod bearing 60. In this example, an interior substantially right cylindrical surface of bore 70 pivotally engages an exterior substantially right cylindrical surface 71 of the eccentric connecting rod bearing. In addition, an interior bore 77 of the eccentric connecting rod bearing is coupled to the crank pin 37. Additional bearings or bushings can be used to couple these components together. The axis 68 in FIG. 1 corresponds to the longitudinal axis of the connecting rod bore 70. In addition, to facilitate the assembly of the structure, the crank coupling end portion 54 of the illustrated connecting rod 50 comprises an upper portion or section 72 that defines an upper portion of the bore 70 and a lower portion or section 74 that defines a lower portion of the bore 70. Fasteners, such as bolts 76, join the crank coupling end portion sections 72, 76 together when assembled on the connecting rod coupling portion 37 of the crank shaft. Although not shown in FIG. 1 or 2 for convenience, but with reference to FIG. 40, in a conventional manner the illustrated crank shaft 34 can comprise respective cheek portions 80, 82 with the connecting rod crank shaft pin portion 36 extending therebetween. Cheek portion 80 comprises a counterweight portion 84 and cheek portion 82 comprises a counterweight portion 86. The counterweight portions 84, 86 are positioned and of a mass that balances the mass of the portion of the crank shaft coupled to the connecting rod so that the center of gravity of the crank shaft is along the crank shaft axis 34.

In accordance with this disclosure, a mechanism is provided for allowing a controlled rotation or pivoting movement of the eccentric 60 when adjustment of the compression ratio is desired. In contrast, the mechanism resists undesirable pivoting of the eccentric connecting rod bearing arising from connecting rod forces that occur during cycles of an engine between top dead center and bottom dead center positions of a piston.

In accordance with the embodiment of FIG. 1, the illustrated eccentric connecting rod bearing or eccentric coupler 60 comprises a projection such as a vane 75. The projection 75 is operable such that pivoting of the projection in one direction increases the offsets between axes 64, 68 and thereby the eccentricity of the eccentric connecting rod bearing and pivoting the projection in the opposite direction decreases the eccentricity of the connecting rod bearing and the offset between axes 64 and 68. The respective directions of pivoting of projection 75 are indicated by double-headed arrow 102 in FIG. 1. The projection 75 can take numerous forms and can be shaped other than as depicted in FIG. 1. In one desirable form, the projection comprises a vane extending radially outwardly from the connecting rod bearing 60 with the axis of the vane aligned with the center 68 of the connecting rod bearing. The illustrated vane comprises a base portion 104, first and second side portions 106, 108 and a distal end portion 110. The distal end portion 110 can be curved with a radius of curvature having a center on the axis 68. The vane 75 extends downwardly in FIG. 1 in a direction generally away from the piston and away from the direction that connecting rod 51 extends from the crank coupling end portion 54. A projection receiving chamber 120 is defined by the crank coupling end portion 54. Desirably the chamber 120 is positioned at least in part, and more desirably entirely, within the lower section 74 of the crank coupling portion 54 of the connecting rod assembly. The illustrated chamber 120 is separated by vane 75 into first and second chamber sections 122, 124 positioned on opposite sides of the vane 75 from one another. Crank coupling end portion 54 can be of a box-like design to provide room for the vane chamber.

In operation, liquid, and more specifically lubricating oil from the engine in a desirable example, is admitted into one of the chamber sections 122, 124 and removed from the opposed chamber section to pivot the vane in a direction toward the chamber from which liquid is being removed. Thus, for example, to move the vane 75 to the left in FIG. 1, to a higher epsilon position in this example, liquid is admitted to chamber section 122 and withdrawn from chamber section 124. To halt the motion of the vane, the flow of liquid is blocked with the remaining liquid in the chambers assisting in holding the vane in the position to which it has been rotated. Conversely, to pivot the vane 75 in the opposite direction to a lower epsilon position in this example, liquid is admitted to chamber section 124 and withdrawn from chamber section 122. By blocking the flow of liquid to and from the chambers, the vane can be maintained in the position to which it has been moved. Although this example describes an eccentric connecting rod bearing with a single vane, it is to be understood that more than one vane can be included with the chamber 120 then subdivided into additional chamber sections.

In the illustrated example, chamber 120 comprises first and second side walls 130, 132, respective first and second end walls 134, 135 (only end wall 134 being shown in FIG. 1, but both end walls being shown in FIG. 2) and a base 138. The side walls 130, 132 in this example can be positioned in planes parallel to the longitudinal axis of the crank shaft. The side walls can also diverge in a direction moving away from the crank pin to accommodate pivoting movement of the distal end 110 of the vane. The base 138 can be arcuate and can have a right cylindrical shape with a center at axis 68 such that, in this example, the surface 110 of vane 75 slides along or in contact with the base 138.

A compression ratio adjuster, one form of which is indicated generally at 150 in FIG. 1, is provided for controlling the flow of liquid into and out of the respective chamber sections to thereby control the movement of the vane and the compression ratio. In a desirable approach, respective outlet ports or passageways are provided from the chamber 120 at various spaced apart positions along the arc of travel of the vane 75. One or more outlet ports, such as one outlet port at a time, is opened to communicate with the chamber section 122 or 124 from which oil is to be withdrawn to permit the flow of oil from such chamber section. Simultaneously, one or more inlet ports leading to the opposed chamber section can be opened for the purpose of delivering oil to the opposed chamber section. An outlet port that has been opened can be closed to stop the movement of the vane at a desired step or location along the direction of travel of the vane 75 to thereby establish the compression ratio epsilon at a value corresponding to the step to which the vane has moved.

The outlet ports communicating with the chamber sections can be positioned at various desirable spaced apart locations, such as in one or both end walls 134, 135 (end wall 134). However, in one desirable approach, the outlet ports are positioned to extend through spaced apart locations of the base surface 138 of the chamber 120. Although any number of outlet ports can be used, in FIG. 1, four such spaced apart outlet ports are shown and indicated by the respective numbers 152A, 152B, 152C and 152D.

As explained more fully below, a compression ratio adjuster can be in the form of a flow controller that controls which of the outlet ports is open to permit liquid flow through the opened outlet port. One form of controller comprises a control drum or pin 160 configured to pivot to position an associated control drum inlet port in communication with a selected one of the chamber section outlet ports to create a liquid flow path.

With reference to FIG. 1, assume the vane 75 is in the position shown by solid lines in this figure. Also assume that the vane is to be moved to the minimum epsilon (minimum compression ratio state or condition). In this case, the port 152A is opened to permit liquid flow from chamber section 122 through the outlet port 152A and the drum controller 160. Simultaneously, as explained below, oil is admitted to chamber section 124. The vane 75 will move to the right in FIG. 1 and will continue to move until such time as the vane entirely closes the outlet port 152A and the flow of fluid from the outlet port is halted. This happens in FIG. 1 when the vane 75 moves to the right hand most dashed position shown in FIG. 1 with the right side 106 of the vane overlying and closing off the right most portion of the port 152A. Conversely, assume the vane is to be moved from the position shown in solid lines in FIG. 1 to a maximum epsilon (maximum compression ratio) position or state shown by the left most positioning of vane 75 in dashed lines in FIG. 1. In this case, the outlet port 152D is opened to provide a flow path for liquid from chamber section 124 through the drum controller to remove liquid from this chamber section. The chamber section 122, opposed to the section 124 from which liquid is being removed, is receiving liquid under these conditions. When the vane 75 has moved to the left most position shown in FIG. 1 with the left side edge 104 of the vane closing off the left most portion of the port 152D, movement of the vane is halted at the desired step position or compression ratio. There can be small variations in the epsilon value when the vane is in the middle positions depending upon the direction traveled by the vane to reach one of the middle positions. That is, when the vane moves from the right to the left, the associated middle port is shut off by the left edge of the vane. In contrast, when the vane is moved from the left to the right, the associated middle port that has been opened is closed when the right side of the vane reaches the closed port position. Thus, there is a variation in the step position that depends upon the thickness of the vane. These variations in step positions can be reduced if desired, for example, by reducing the thickness of the vane to be slightly greater than the width of the outlet ports. However, these minor differences in epsilon associated with these step positions as a practical matter are inconsequential and can be ignored.

Desirably, the first and second valves are closed upon movement of the projection to the second or third positions such that, while the outlet ports are closed, the liquid in the chamber sections maintain the projection in the position to which it has been moved.

As will be explained more fully below, in one specific form of compression ratio adjuster, a drum controller 160 is pivotally supported by a portion of the lower section 74 of the crank coupling end portion 54 for pivoting about a longitudinal axis 165 that is perpendicular to the crank pin axis 64 and to the eccentric bearing axis 68. The control drum 160 can comprise an internal longitudinally extending passageway 166. Respective inlet ports leading to the internal passageway are provided at axially and rotationally displaced positions along the control drum 160. Pivoting of the control drum to a selected position, results in a respective inlet port of the control drum being aligned with a respective associated chamber outlet port (e.g., one of the ports 152A through 152D). When aligned, a flow path is provided from the chamber through the associated outlet port, through the associated inlet port of the control drum, and through the control drum passageway 166 to a desired destination such as to the oil pan of an engine. A control drum adjuster mechanism is provided for adjusting the rotational position of the control drum 160. In one specific form, the control drum adjuster comprises an adjustment projection, such as an adjustment finger 170, coupled to the control drum 160 and extending downwardly from an end portion 172 of the control drum. The finger 170 is engaged and rotated to rotate the control drum to a desired position to open a desired liquid passageway from one of the chamber sections 122, 124 at times when adjustment of the compression ratio is desired.

Figure 40:
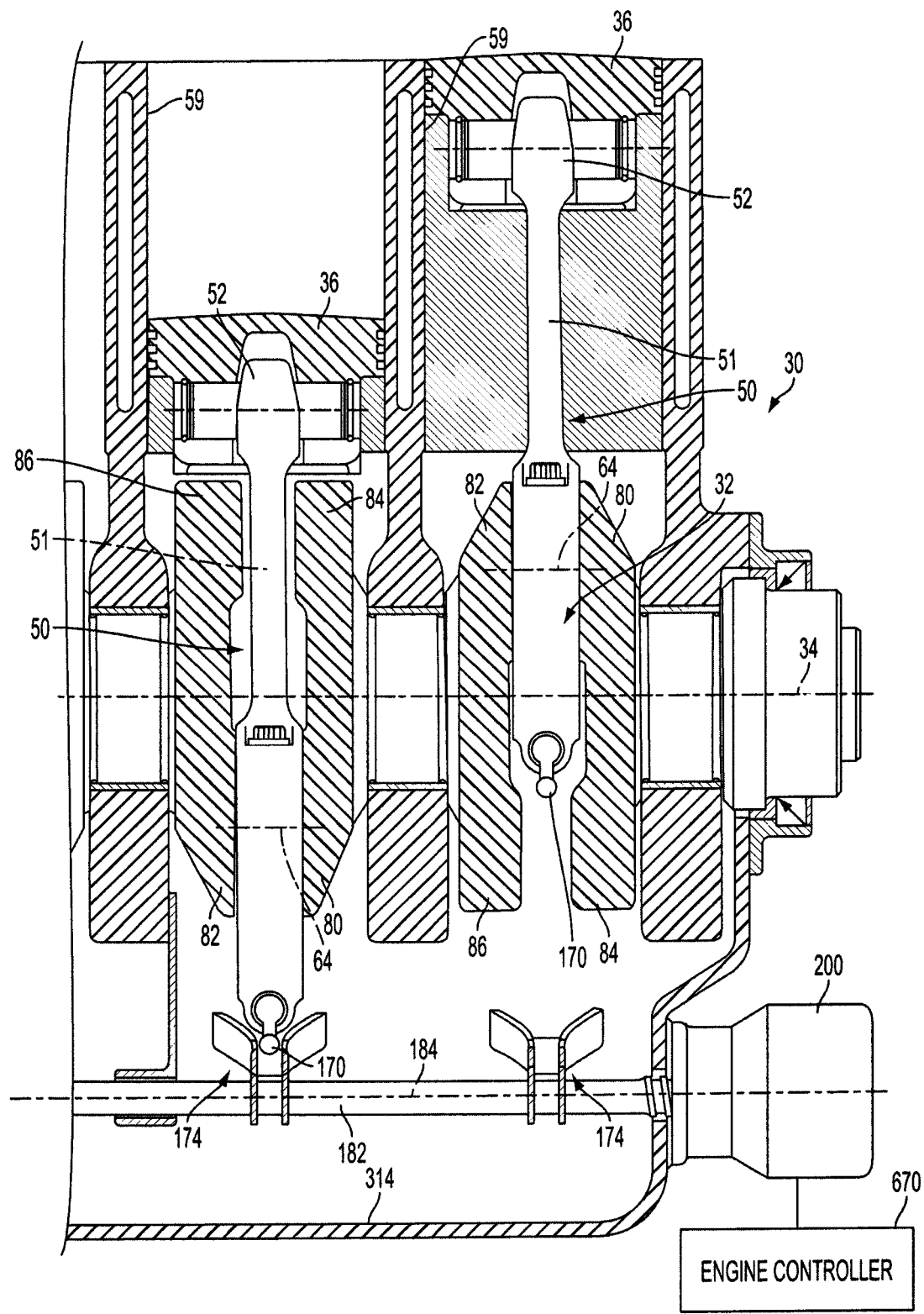
FIG. 40 is an illustration of a portion of an internal combustion engine with a stepwise variable compression ratio.

An adjustment projection engager such as an adjustment guide is provided and operable to adjust the position of the control drum projection, in this example the finger 170, and thereby the rotational position of the drum controller 160. One form of such an adjustment guide is shown in FIG. 2. The illustrated guide, which can comprise a component of the compression ratio adjuster that includes the drum controller 160 and projecting finger 170 in this example, is indicated by 174 in FIG. 2. The illustrated guide comprises a guide trough 176 with respective guide wings or walls 178, 180. The guide 174 is coupled to a compression ratio adjustment shaft 182, which also can comprise a portion of a compression ratio adjuster. The compression ratio adjustment shaft 182 has a longitudinal axis 184 that is parallel to the crank shaft axis 34 (FIG. 40). The shaft 182 is movable axially in opposed directions as indicated by double headed arrow 190 in FIG. 2. As will be explained in more detail below, assuming no adjustment of the compression ratio is to take place, then the adjustment guide 174 is maintained in the position to which it had been previously positioned. As the piston approaches the bottom dead center position, the finger 170 is positioned in the trough 176 of the guide 174 and remains in the position to which it was previously adjusted. In contrast, assuming the shaft 182 has been moved to the left in FIG. 2, as the piston associated with the guide 174 approaches a bottom dead center position, the finger 170 is located to the right of the trough 176 (see the dashed line position of finger 170 to the right in FIG. 2). In this case, wing 178 engages finger 170 and guides the finger to the trough 176 and rotates the finger and control drum in the process to position a desired new outlet port in communication with a flow path through the drum controller. Conversely, if the shaft 182 is moved to the right in FIG. 2, as the associated piston approaches the bottom dead center position, the finger 170 (shown in dashed lines to the left in FIG. 2) is then positioned to engage the wing 180 of the guide 174 with wing 180 guiding the finger to the trough 176 and rotating the drum controller 160 to position the drum controller in a position that provides an outlet path communicating with another of the outlet ports from the chamber section from which oil is to be drained.

The shaft 184 can be moved axially along the directions of arrow 190 by any suitable adjustment mechanism such as a worm drive or other mechanism. One desirable mechanism comprises a stepper motor 200 (FIG. 40) operable in response to control signals from an engine controller 670 to control the rotation of shaft 182 and resulting axial movement of the shaft in the desired direction 190 to adjust the compression ratio.

With reference to the above described embodiment, the operating principles of this embodiment will become apparent with reference to FIGS. 3A through 8B.

Figure 3A:
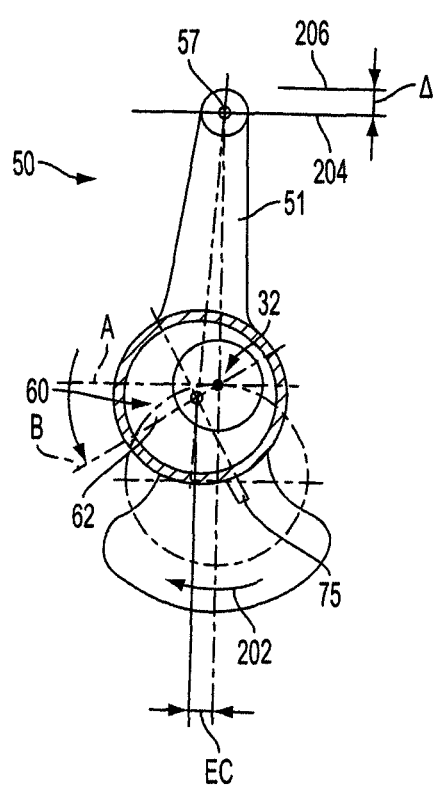
FIG. 3A is a schematic illustration of the top dead center (TDC) position of an exemplary connecting rod assembly with an eccentric thereof rotated plus 30 degrees (leading the direction of rotation of the crank shaft) and the resulting difference or Δ position of travel in comparison to a maximum lagging position of the eccentric shown in FIG. 3B.
Figure 3B:
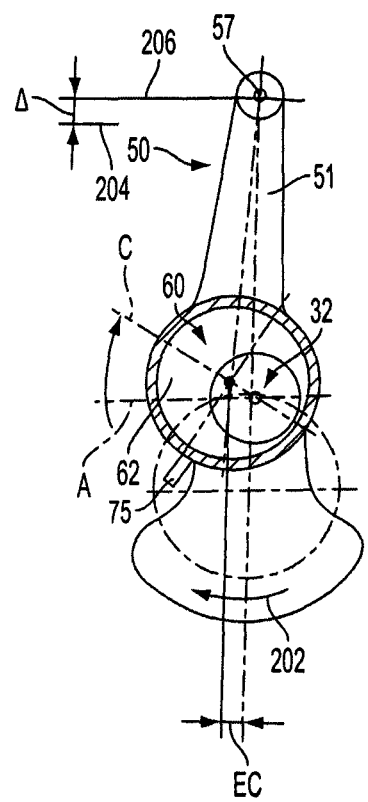
FIG. 3B shows the TDC position of the connecting rod bearing assembly with the eccentric bearing being rotated minus 32 degrees (lagging the direction of rotation of the crank shaft) and the resulting difference or Δ in piston travel between the maximum leading position of FIG. 3A and maximum lagging position of the eccentric of FIG. 3B in the illustrated exemplary embodiment.

With reference to FIGS. 3A and 3B, assume a gasoline engine has a bore of 82 millimeters and a stroke of 86 millimeters. In this case, the difference or Δ of the piston position in the top dead center positions from a low epsilon (epsilon 9) to a high epsilon (epsilon 14) would be 4.2 mm. Under the assumption that the eccentric bearing is rotated 64 degrees between the minimum and maximum epsilon positions, the eccentricity (EC) to accomplish the desired Δ would be 4 mm. In this specific example, FIG. 3A shows the top dead center (TDC) position of the connecting rod assembly 50. In this position, the eccentric bearing is rotated minus 32 degrees from position A to position B, in a direction counter to the direction (see arrow 202) of rotation of the crank shaft, to a low epsilon or low compression ratio position. The position of pin axis 57 is shown at an elevation 204 in FIG. 3A. In contrast, in FIG. 3B, the eccentric bearing is shown rotated 32 degrees from position A to position C in the direction (see arrow 202) of rotation of the crank shaft to a high epsilon or high compression ratio position. When in the position shown in FIG. 3B, the pin axis 57 of the piston pin is shown at an elevation 206, which is above the elevation 204. The distance between elevations 204 and 206 is indicated by Δ in FIGS. 3A and 3B and corresponds to the total piston travel between minimum and maximum Δ positions which, in this example, is 4.2 mm.

Figure 4A:
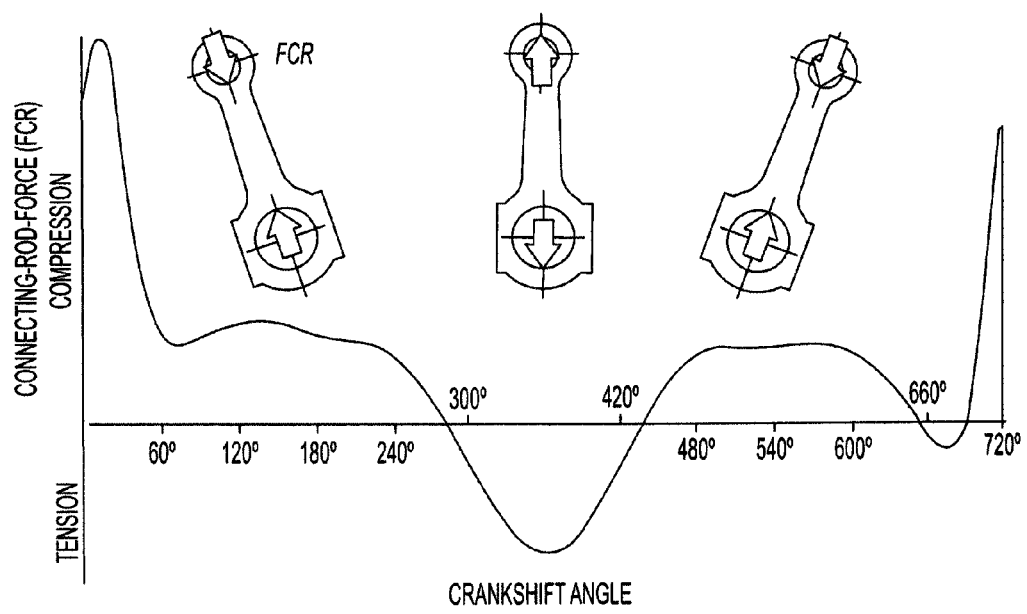
FIG. 4A illustrates the connecting rod forces (FCR) over the course of four stroke portions (intake, compression, working and exhaust) of an exemplary gasoline engine piston cycle showing that the FCR changes twice from compression to tension and back during an engine piston cycle.
Figure 4B:
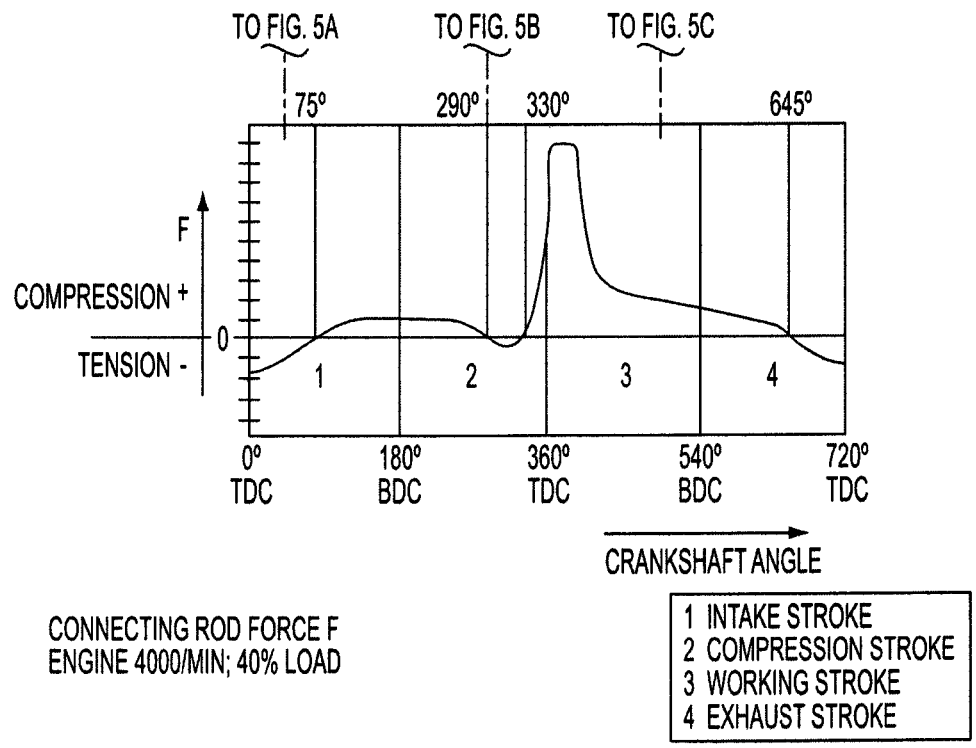
FIG. 4B schematically illustrates another example of expected connecting rod forces for an exemplary gasoline engine operating at a speed of 4,000 revolutions per minute and at 40 percent load with the connecting rod forces passing through zero four times during the four stroke portions (intake, compression, working and exhaust) of the engine piston cycle in this example.
Figure 5A:
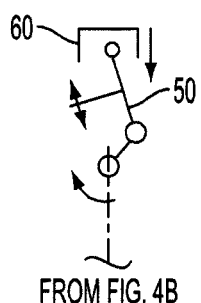
FIGS. 5A, 5B and 5C schematically illustrate tension and compression forces on the connecting rod at selected piston positions during a working cycle of a piston.
Figure 5B:
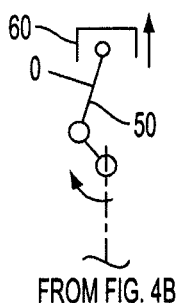
Figure 5C:
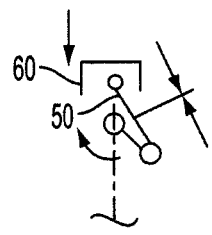

FIGS. 4A and 4B schematically illustrate connecting rod forces over the course of four stroke portions (intake, compression, working and exhaust) of an exemplary gasoline engine piston cycle showing that the FCR changes at least twice from compression to tension and back during these four stroke portions of an engine piston cycle. For example, as can be seen from FIG. 4B, in an exemplary engine operating at 4,000 rpm at 40 percent load, the force on the connecting rod passes through zero four times. Specifically at: (a) 75° from top dead center (TDC) during the intake stroke; (b) at 70° and 30° before TDC during the compression stroke, and (c) at 75° before TDC during the exhaust stroke. Under the influence of gas pressure following ignition, compression of the connecting rod occurs. This is also true during acceleration of the piston following the bottom dead center position. Before the top dead center position is reached, the force in the connecting rod changes to tension. This is also the case with the intake stroke, following the top dead center position, during the intake of combustion air. The force in the connection rod therefore, at least twice during a working cycle of an engine piston, passes through a point where it is zero. FIGS. 5A, 5B and 5C illustrate the changes in forces on the connecting rod during a working cycle (the exhaust stroke not being separately depicted in these figures). These forces are thus relatively low as the BDC position is approached. As the piston approaches the bottom dead center position, the pivot or turning member, such as the finger 170 in FIG. 1, when engaged to vary the compression ratio, rotates the control drum as previously explained. Once the control drum is rotated to the desired position, oil is delivered to one chamber section (in the FIG. 1 example), and removed from the other chamber section to move the projection 75 and change the compression ratio. The change in position of projection 75 does not happen instantaneously and is completed typically after the piston leaves the bottom dead center position.

Figure 6A:
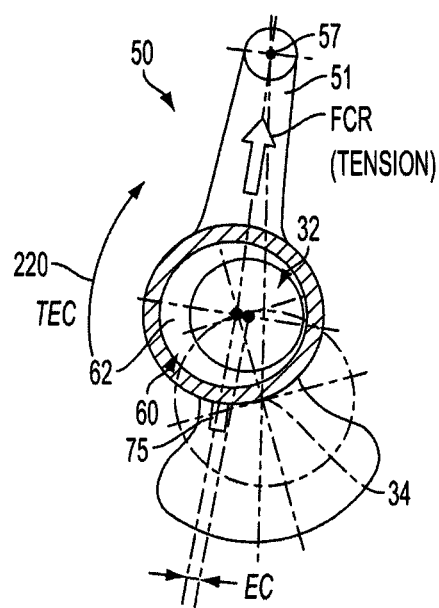
FIGS. 6A and 6B schematically illustrate how the change in direction of the connecting rod forces (FCR) in conjunction with the eccentricity of a coupler that couples the connecting rod assembly to a crank shaft, results in respective clockwise and counter-clockwise eccentricity torques (TEC) that can be used to assist in rotation of an eccentric coupler in a controlled manner to adjust the compression ratio of the internal combustion engine. In this example, TEC corresponds to the torque of the eccentric coupler or the eccentricity torque.
Figure 6B:
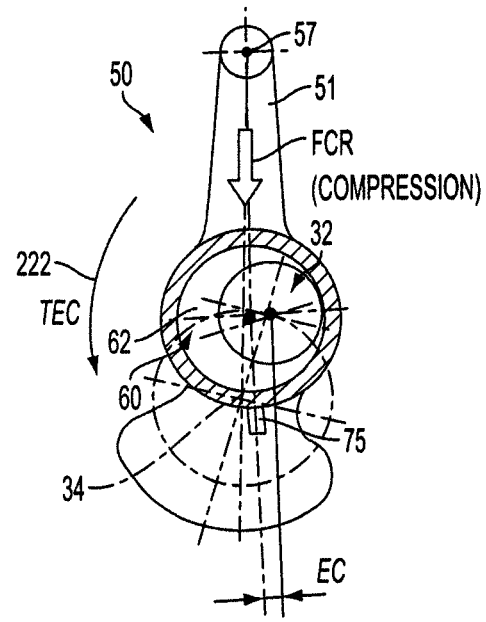
Figure 7A:
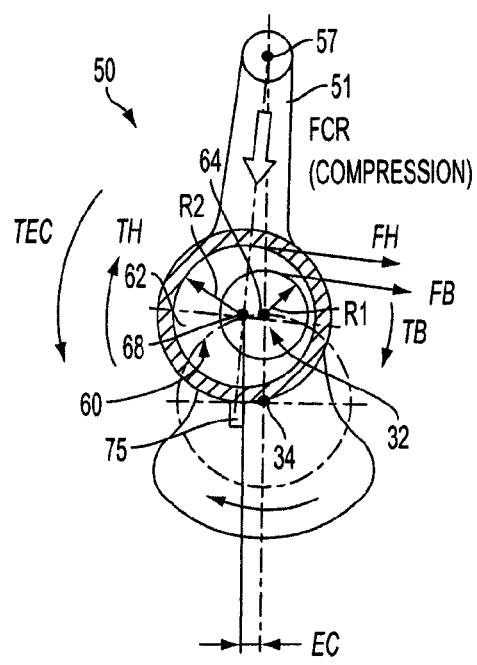
FIG. 7A schematically illustrates the eccentricity torque (TEC), a holding torque (TH) and bearing torque (TB) under conditions with the connecting rod forces FCR in compression. In this figure, FB corresponds to the bearing friction force and FH corresponds to the holding friction force.
Figure 7B:
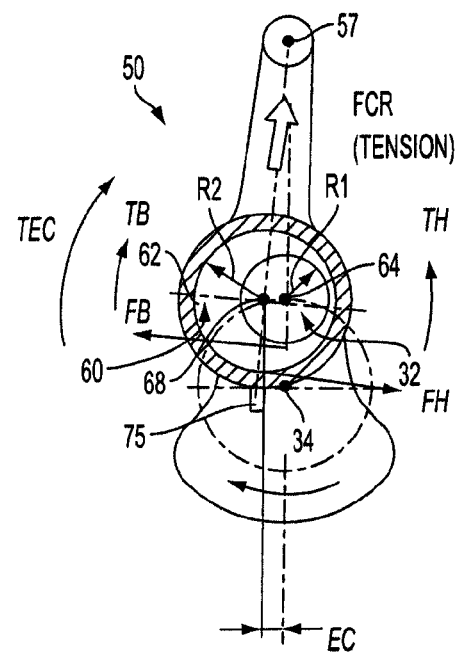
FIG. 7B is similar to FIG. 7A except that the connecting rod forces (FCR) are shown in tension.

As best seen in FIGS. 6A and 6B, the change in direction of the connecting rod forces FCR in conjunction with the eccentricity (EC) of the connecting rod bearing results in respective eccentric torques (TEC) that are clockwise in FIG. 6A when the connecting rod is in tension, as indicated by arrow 220. In contrast, in FIG. 6B TEC is counterclockwise when the connecting rod is in compression as indicated by arrow 222 in FIG. 6B. These respective eccentricity torques can be used to assist in rotating or pivoting the eccentric connecting rod bearing in a controlled manner when the compression ratio is to be adjusted. As can be seen in FIGS. 7A and 7B, three torques result from the connecting rod force (FCR) in conjunction with the turning of the crank shaft. These torques are respectively:

Eccentric torque (TEC)=FCR×EC
Bearing torque (TB)=FCR×friction coefficient×R1
Holding torque (TH)=FCR×friction coefficient×R2.

These torques (TEC, TB and TH) are shown in FIGS. 7A and 7B. In these figures, FH refers to the holding force and FB refers to the bearing force.

The connecting rod force in compression is typically considerably higher than the connecting rod force in tension. To reduce the resulting torque on the eccentric bearing 60 in compression (to limit the applied load on the adjustment system) as explained below, it is desirable to position the eccentricity 62 such that the bearing torque (TB) and holding torque (TH) are opposed to the eccentric torque (TEC) as shown in FIG. 7A at least when the forces on the connecting rod are in compression.

In various embodiments disclosed herein, the projection is pivoted toward an outlet port to be closed in either a clockwise or counter-clockwise direction depending upon the relative positions of the vane and outlet port to be closed. In addition, an eccentric bearing torque TEC is applied to the vane at various times in respective clockwise and counter-clockwise directions as the piston moves from a top dead center position, to a bottom dead center position and back to the top dead center position. The torque TEC, during times that TEC is applied in the direction in which the projection is being pivoted to close an outlet port, moves the vane toward the open outlet port.

Figure 8A:
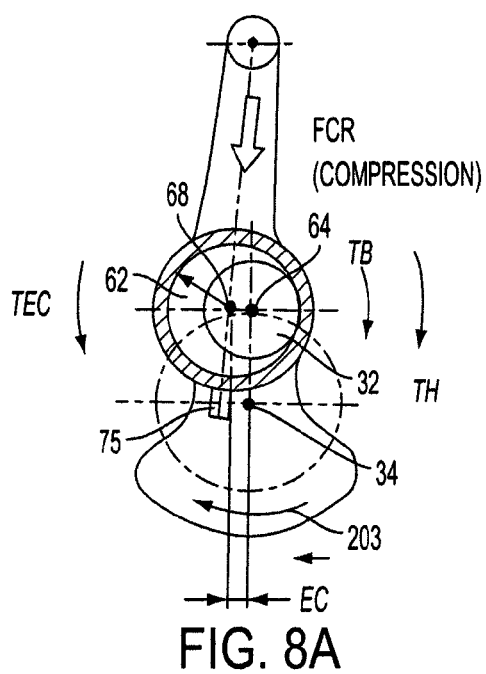
FIGS. 8A and 8B illustrate a desirable positioning of the eccentric such that the eccentricity torque (TEC) opposes both the bearing torque (TB) and holding torque (TH) with the crank being rotated clockwise in FIG. 8A and counter-clockwise in FIG. 8B, and with the connecting rod forces (FCR) being shown in compression in each of these figures.
Figure 8B:
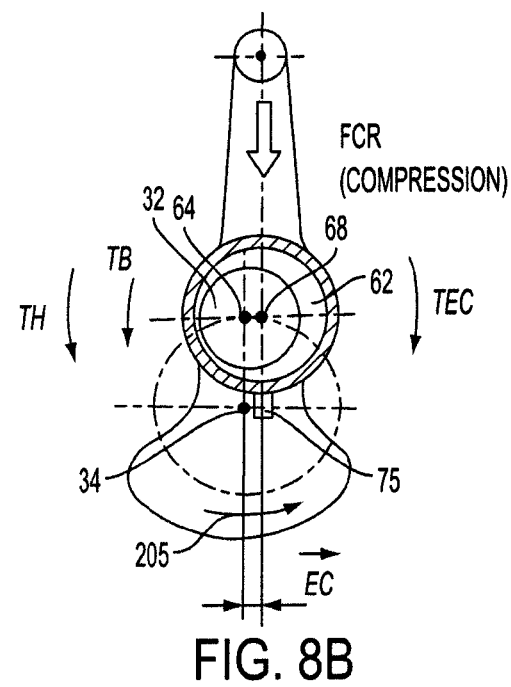

In FIGS. 8A and 8B, when looking in the directions illustrated, the eccentricity is desirably at the left side of the center line of the crank shaft pin 32 when the crank shaft pin by design is rotating clockwise (see arrow 203 in FIG. 8A), and at the right side of the center line of the crank shaft pin when the crank shaft is rotating counterclockwise (see arrow 205 in FIG. 8B). Thus, the eccentric portion 62, or at least a major portion or maximum eccentricity portion thereof, is desirably positioned at the side of the first axis 64 and center line of the crank shaft pin 32 that results in the eccentric torque TEC opposing both the bearing torque (TB) and holding torque (TH) at least when the connecting rod forces are in compression.

Thus, for an engine designed for the crank shaft to rotate in a clockwise direction and when looking in a direction along the first axis from a position outside of the crank shaft coupler toward the crank shaft coupler, the portion of maximum eccentricity of the eccentric portion is positioned at the left side of the center line of the crank shaft pin. In addition, for an engine designed for the crank shaft to rotate in a counterclockwise direction and when looking in a direction along the first axis from a position outside of the crank shaft coupler toward the crank shaft coupler, the portion of the maximum eccentricity of the eccentric portion is positioned at the right side of the center line of the crank shaft pin.

Figure 9C:
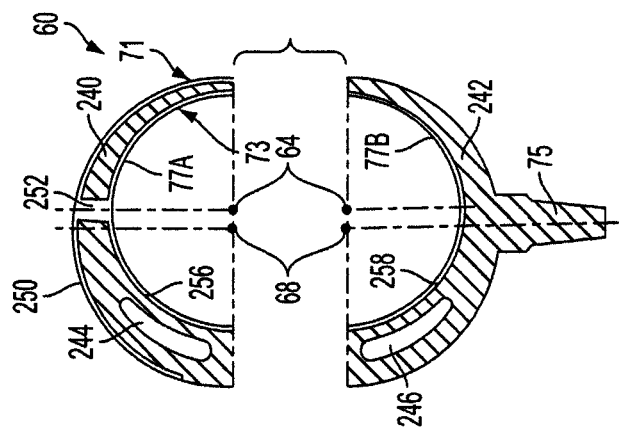
FIG. 9C is a vertical sectional view, taken along line 9C-9C of FIG. 9B, of the eccentric coupler embodiment.
Figure 9B:
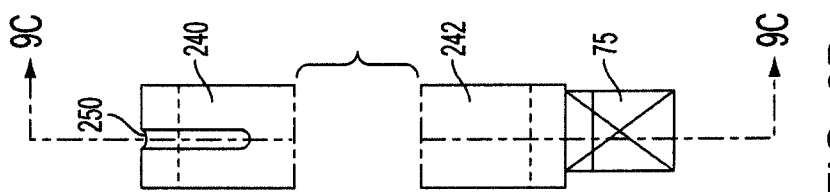
FIG. 9B is a side elevational view of the eccentric coupler embodiment of FIG. 9A.
Figure 9A:
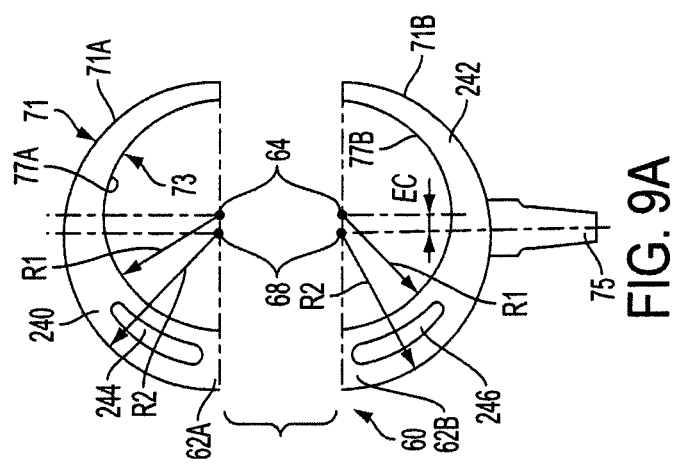
FIG. 9A illustrates one embodiment of an eccentric coupler with an exemplary form of a projection for use in moving the eccentric coupler relative to the crank shaft.

An exemplary eccentric coupler that can be used in the embodiment of FIG. 1 is shown in FIGS. 9A, 9B and 9C. As can be seen in FIG. 9A, the illustrated eccentric coupler comprises first and second coupler portions 240, 242 that can comprise respective eccentric shell portions or sections. By making the eccentric coupler in plural sections, the eccentric sections can be readily positioned to surround the crank pin 32 without the need to remove the crank shaft from the engine. Although more than two such sections can be used, in the embodiment of FIG. 9A only two are shown. When assembled together, the shell sections 240, 242 define an internal right cylindrical bore 73 for receiving the crank shaft pin when sections 240, 242 are coupled to the crank shaft. The center or longitudinal axis of bore 73 is aligned with the axis 64 and thus with the axis of the crank shaft pin. The portion of bore 73 along the interior of upper eccentric shell 240 is indicated at 77A in FIG. 9A. The portion of bore 73 defined by the lower shell section 242 is indicated by 77B in FIG. 9A. The eccentric is indicated in FIG. 9A as eccentric portions 62A and 62B which form the eccentric 62 (FIG. 1) when the eccentric connecting bearing is assembled onto the crank pin. The exterior of the eccentric connecting bearing 60 also defines a right cylindrical surface indicated by the number 71 in FIG. 9A where the surface contacts or is coupled to the crank coupling end portion of the connecting rod assembly. The surface 71 need not be entirely of the right cylindrical form as for example, lubricant flow passageways and other features can be incorporated into surface 71. However, when assembled, the surface of 71A and 71B of the upper and lower shell sections which together form surface 71 in this example are desirably of a right cylindrical form. Thus, in the FIG. 9A embodiment, the crank shaft coupler comprises first and second eccentric shell portions 240, 242. In addition, the second eccentric shell portion 242 is spaced further from the piston than the first eccentric shell portion 240. In addition, the projection 75 extends outwardly from the second or lower eccentric shell portion 242.

In one desirable form, the projection 75 comprises an integral unitary monolithic portion of the eccentric coupler and more specifically, in this example, of the second eccentric shell portion 242. For example, the projection and shell portion 242 can be cast or forged as a unit. Alternatively, the projection 75 can be mounted, such as by welding (e.g., by electronic welding), to the shell section 242 and can have a base portion recessed into the shell portion.

As also depicted in FIG. 9A, respective recesses or voids 244, 246 can be provided in the respective shell sections to lighten the weight of the shell sections.

With further reference to FIG. 9A, the first eccentric shell portion 240 can comprise a first crank shaft bearing surface 77A positioned to pivot in contact with the connecting rod coupling portion of the crank shaft. In addition, shell portion 240 can comprise a first connecting rod bearing surface 71A positioned to pivot in contact with the crank coupling end portion of the connecting rod assembly. Also, the second eccentric shell portion 242 can comprise a second crank shaft bearing surface 77B positioned to pivot in contact with the connecting rod coupling portion of the crank shaft. The second shell portion 242 also can comprise a second connecting rod bearing surface 71B positioned to pivot in contact with the crank coupling end portion of the connecting rod assembly. Desirably, the outer surface 71A has a lower average coefficient of friction than the average coefficient of friction of the outer surface 71B of the lower shell portion 242. This assists in holding the projection 75 in the position to which it has been pivoted as the piston cycles between the TDC and BDC piston positions. For example, the outer upper surface 71A of shell portion 240 can be of, comprise, or be coated with a bearing metal in whole or in part and the outer surface 71B can be of or comprise a higher coefficient of friction material, such as uncoated steel.

With reference to FIG. 7A, with the FCR in compression, the holding friction torque TH and bearing friction torque TB are in the same direction and opposed to the eccentric torque TEC. If the holding friction torque, which is calculated as FCR (compression)×friction coefficient R2 of the upper shell×R2 of the radius of the outer surface is too high, then the resulting torque on the eccentric connecting rod bearing (TEC−TB−TH) would be too low to effectively turn the connecting rod bearing when an adjustment of the compression ratio is initiated, at least in the absence of pressurized fluid flow to assist in this adjustment. In contrast, as seen in FIG. 7B, in the case where FCR is in tension, TEC and TB are additive and thus only TH is directed against the desired adjustment. If TH which calculates as FCR (tension)×friction coefficient R2 lower shell×R2 is too low, then the resulting torque on the eccentric connecting rod bearing (TEC+TB−TH) will provide an unnecessary burden or high load that resists adjustment by the adjustment system.

By choosing the friction coefficient for R2 (surface 71A) of the upper shell to be of a different lower value, or lower average value, than that of the friction coefficient for R2 (surface 71B) of the lower shell of the eccentric connecting rod bearing, the potential negative effects of these torques on movement of the projection 75 (FIG. 1) are reduced. Alternative coatings or materials for the surfaces 71A and 71B can be used. Also, one or more portions 71A of the upper shell 240 can be coated in part with a bearing material or comprise a lower friction material with the rest being uncoated steel or a higher friction material. In this case, the surface 71B of the lower shell 242 can be partially uncoated steel or partially comprise a higher coefficient of friction material and the rest bearing material or a lower coefficient of friction material to achieve, in both cases, a mixed friction coefficient. Again, the surfaces can be treated or formed such that the average coefficient of friction of the shell portion 71A is lower than the average coefficient of friction of the lower surface 71B. The interior surfaces 77A, 77B of eccentric connecting rod bearing 60 typically comprise a bearing or other friction reducing material.

FIG. 9B illustrates a lubricant distribution channel 250 extending partially around the circumference of the eccentric shell section 240. Oil distribution channel 250 is recessed into the surface 71 with its location shown in greater detail in FIG. 9C. Oil entering the space between the crank pin 32 and the assembled eccentric connecting bearing coupler 60 can flow outwardly through a channel or port 252 to the channel 250 for distribution as explained below. The interior surfaces 77A, 77B of eccentric shell portions 240, 242 can also be provided with a similar circumferentially extending channel (channel 256 for surface 77A and 258 for surface 77B) to assist in delivering oil to the passageway 252. As explained below, this is one approach for delivering oil to the desired chamber section when the projection 75 is to be moved. This will become more apparent from the discussion below.

FIG. 10A illustrates a sectional view of a one form of an exemplary lower portion 74 of the crank coupling end portion of the connecting rod assembly. The same numbers have been used for the same components in FIG. 10A as were used in FIG. 1. Consequently, these same components will not be discussed further in connection with FIG. 10A. The illustrated section 74 comprises first and second fastener receiving openings 270, 272 for receiving the respective fasteners 76 (FIG. 1) to secure the connecting rod assembly together around the associated crank pin without requiring the removal of the crank shaft to install the connecting rod assembly. The housing section 74 also comprises a control drum supporting portion 274. In this example, drum supporting portion 274 defines a longitudinally extending control drum receiving bore 276 for receiving the control drum 160 shown in FIG. 1. The respective outlet ports 152A, 152B, 152C and 152D communicate with respective passages or ports 280A, 280B, 280C and 280D to respective openings 284A, 284B, 284C and 284D, which are positioned for alignment with an associated opening in the control drum when the control drum is moved to a position aligning the associated inlet opening in the control drum with one of the openings 284A-284D. FIG. 10B illustrates another view of the chamber defining section of the connecting rod assembly of FIG. 10A. In addition, FIG. 10C illustrates a top view of this exemplary lower connecting rod assembly portion 74 to further clarify the understanding of this embodiment.

Figure 11:
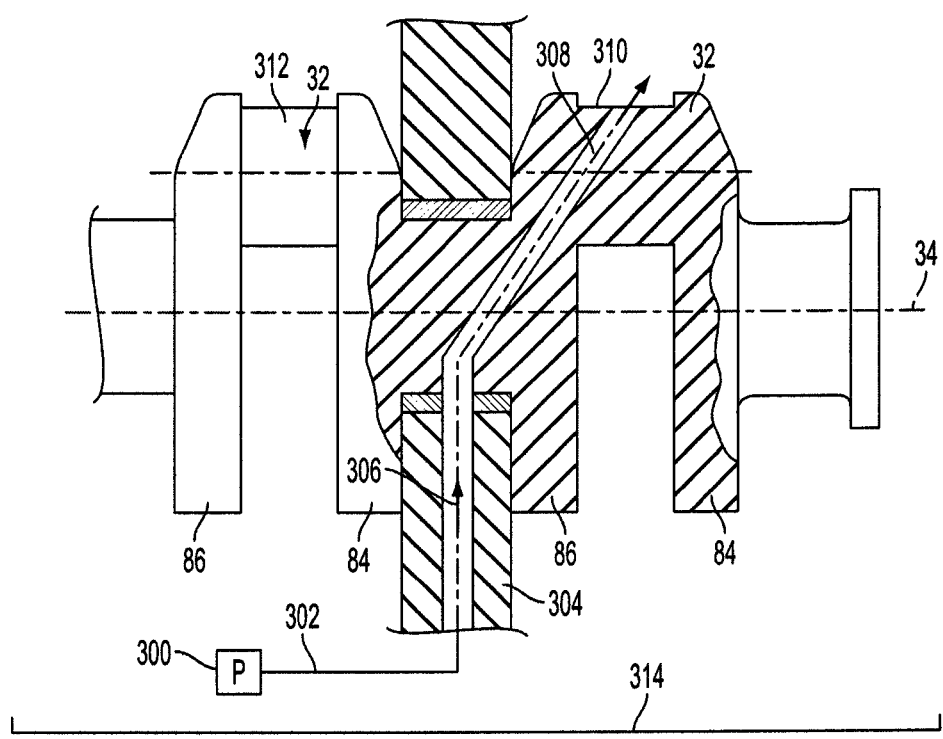
FIG. 11 is a side elevational view, partially in section, of a portion of an exemplary crank shaft illustrating the flow of pressurized engine oil from the main bearing of a crank shaft to the area to which an eccentric connecting rod bearing is mounted for delivering lubrication fluid, such as engine oil, to the connecting rod bearing.

FIG. 11 schematically illustrates an oil pump 300 and a portion of an oil circuit 302 along which lubricating oil under pressure is delivered through a crank shaft support 304, and more specifically through passageway 306 therein and through the crank shaft via a passageway 308 to an exterior surface 310 of the crank shaft pin 32 to which the eccentric connecting rod assembly is mounted. In the same manner, lubricating oil is delivered to the surface 312 of the adjoining crank pin 32. An oil pan 314 is shown beneath the crank shaft for collecting oil from the engine, including any oil returned from the control drum as the compression ratio is adjusted.

Figure 12:
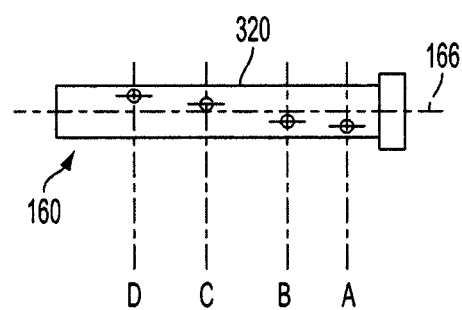
FIG. 12 is a top view of one form of controller, such as in the form of a pin or drum, for providing passageways for lubricant flow from a section of a chamber provided in a lower connecting rod section of an embodiment of a connecting rod assembly, with the passageway that is positioned in communication with the chamber section being dependent upon the rotational position of the controller.
Figure 13:
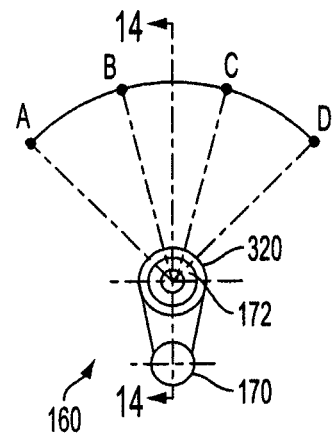
FIG. 13 is an end view of the embodiment of the controller of FIG. 12.
Figure 14:
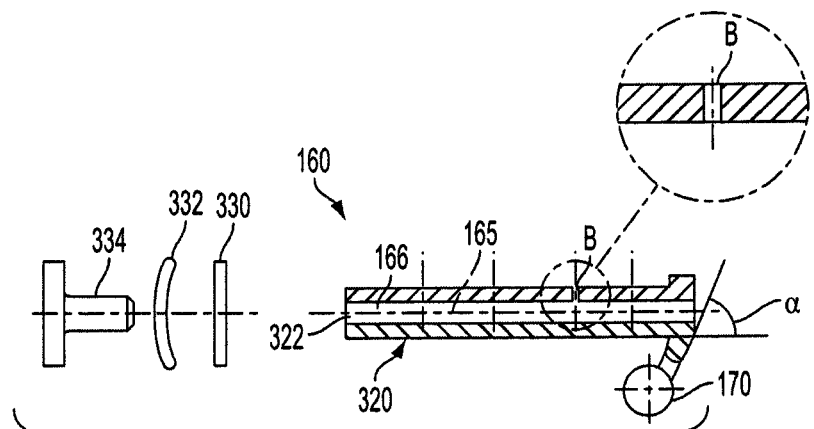
FIG. 14 is a vertical sectional view, taken along line 14-14 of FIG. 13, showing one passageway leading from the exterior of the control drum to an interior passageway along the axis of the control drum, the illustrated passageway from the exterior of the control drum corresponding to passageway B in FIG. 12.

FIGS. 12 through 14 illustrate an exemplary form of control drum 160 that can be used in the embodiment of FIG. 1, as well as in a number of other embodiments disclosed herein. With reference to these figures, control drum 160 is elongated and comprises, for example, a hollow pin or rod 320 having an internal passageway 166 extending lengthwise along the rod 320. The rod 320 has a longitudinal axis 165 and is supported by the housing section 274 (shown in FIG. 10A) for rotation about the axis 165 to plural rotational positions. A plurality of passageways or inlet ports labeled A, B, C and D in FIG. 12, extend from the surface of the rod 320 to the interior passageway 166 thereof. Thus, for example, in FIG. 14 passageway B is shown communicating through the rod to the interior passageway 166. The passageways A-D are spaced along the length of the rod 320 and are offset rotationally from one another about the axis 165. Thus, as can be seen in FIG. 13, openings A, B, C and D are at different rotational positions on the surface of rod 320. Consequently, rotation of the rod by engaging and pivoting finger 170 (FIGS. 13 and 14) results in pivoting of the respective openings about the axis 165. These openings can be pivoted to respective positions where opening A is aligned with passageway 280A (see FIG. 10A); opening B is aligned with passageway 280B; opening C is aligned with passageway 280C and opening D is aligned with passageway 280D. To assemble the control drum to the crank coupling section 74 of the connecting rod assembly, the rod 320 is inserted into the receptacle or bore 276 (FIG. 10A) of the connecting rod assembly. A spacer or washer 330 can be placed over the end 322 of rod 320. In addition, a spring washer 332 can be placed over end 322 with a retainer 334 inserted into the end 322 of rod 320 to compress spring washer 332 to provide friction to assist in holding the control drum in the position to which it has been rotated on the connecting rod assembly. The spring washer 332 comprises one form of a friction brake that resists the motion of the control drum until such time as compression ratio adjustment is to take place. Retainer 334 can be threaded into and threadedly received by the end 322 of rod 320 such that rotation of the retainer adjusts the spring force applied by the spring to thereby provide an adjustable friction brake for adjusting the resistance of the control drum to rotation relative to the connecting rod coupling portion 74 (FIG. 10A).

The illustrated control drum has a length that is desirably less than the width of the second section 74 of the crank coupling end portion in a direction perpendicular to the longitudinal axis of the connecting rod 51 when the piston is in the bottom dead center position. This position would be similar to that shown in FIG. 1 except that FIG. 1 shows the connecting rod assembly in a top dead center position. Thus, in FIG. 1 the respective ends of the control drum 160 are spaced inwardly from the sides of the connecting rod crankshaft coupling portion so that the compression ratio adjuster, in this case comprising in part the control drum, can move with the crank shaft without contacting the engine block, oil pan or crank shaft components. In addition, the drum position adjuster, in the case of a projecting finger 170, is shown in this example of FIG. 14, as extending from one end portion of the control drum at an acute angle α. Desirably in an embodiment, α can range from 12 degrees to 28 degrees from a longitudinal axis of the control drum 160 and is angled inwardly toward a line passing through the longitudinal axis of the connecting rod 51. This configures the finger 170 to clear adjoining crank shaft components as the crank shaft is rotated to move the connecting rod between top dead center and bottom dead center positions. The bores A, B, C and D (FIG. 12) of the control drum can be dimensioned to function as throttling ports to control the speed of rotation of the projection 170 by controlling the rate of flow of liquid from a chamber section when an associated port is moved in communication with the associated passageway leading to one of the chamber sections. For example, the bores A, B, C and D can be sized to have a diameter between 4 mm and 1.2 mm, although other dimensions can be used. Alternatively, one or more of the outlet ports 152 A-D (FIG. 10A) passageways 280 A-280 D, or openings 284 A-284 D, can be sized to function as throttling ports instead of, or in addition to sizing the bores A-D to function as throttling ports.

Figure 15:
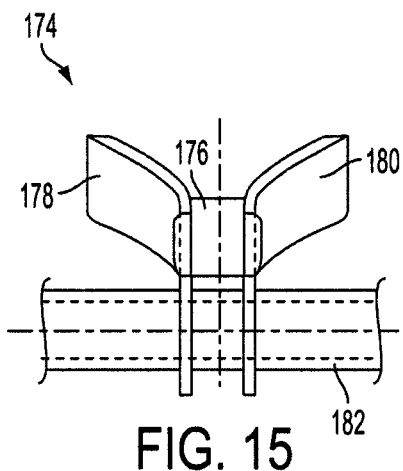
FIG. 15 illustrates an exemplary form of drum position adjuster engager or guide movable to engage a projecting portion of the control drum and to rotate the control drum to a selected position that places a desired passageway in communication with a chamber section in the event the compression ratio of the internal combustion engine is to be adjusted.
Figure 16:
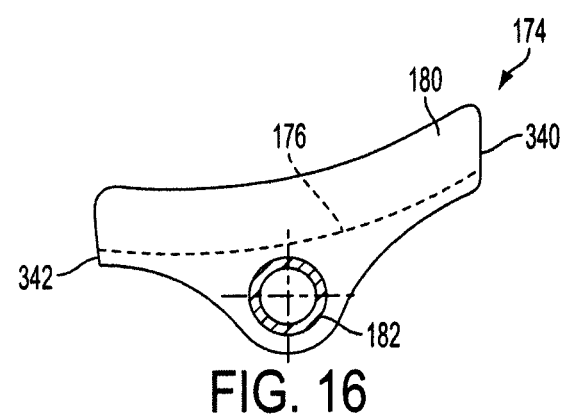
FIG. 16 is a side elevational view of the embodiment of the drum position adjuster engager of FIG. 15.
Figure 17:
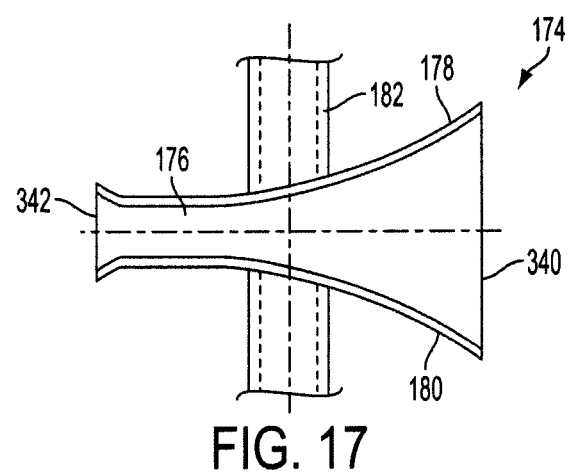
FIG. 17 is a top view of the embodiment of the drum position adjuster engager of FIG. 15.

FIGS. 15 through 17 illustrate an exemplary form of control drum adjustment engager that can be used to engage the projection or finger 170 of the control drum as the piston approaches the bottom dead center position so as to adjust the control drum by rotating the control drum to a desired position to result in the desired change in the compression ratio. With reference to FIGS. 15, 16 and 17, the illustrated control drum adjuster engager comprises a slide 174 for guiding the movement of the finger 170 to the desired position as the finger advances downwardly as the piston moves toward the bottom dead center position. The guide in effect can comprise a funnel that is open from above. The trough 176 of slide 174 (mentioned above in connection with FIG. 2), can comprise a base portion of the guide. The wings or walls 178, 180 that bound the sides of the base portion converge toward one another moving from an elevated upper portion 340 of the guide toward a lower elevation lower portion 342 of the guide. In the event the compression ratio is to be changed, the converging side walls or wings of the guide are configured to engage the drum position adjuster, in this case finger 170, as the piston approaches the bottom dead center position. The wings move the finger 170 from one position to another position so as to thereby move the control drum from one rotational position to another rotational position. The movement of the control drum is thus in response to movement of the control drum adjuster engager from one selected engagement position to another selected engagement position.

Figure 18A:
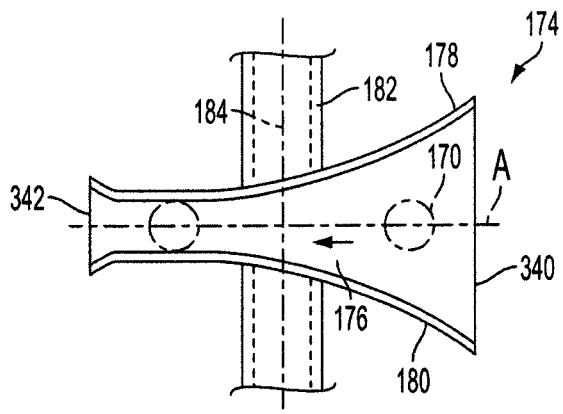
FIGS. 18A, 18B and 18C schematically illustrate the operation of the drum position adjuster engager as a projecting portion of the control drum moves with the piston toward a bottom dead center position; with FIG. 18A showing the movement of the projection along the drum position adjuster engager when no compression ratio is to occur.
Figure 18B:
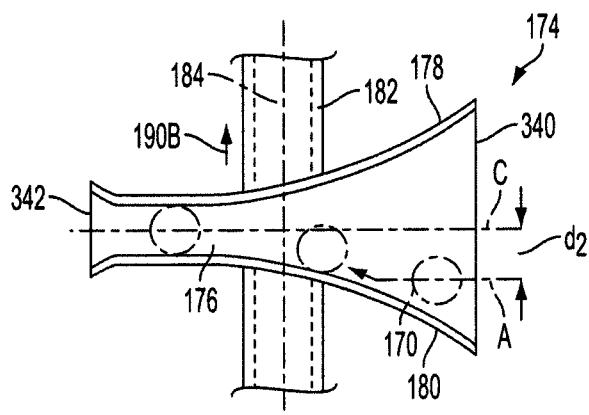
Figure 18C:
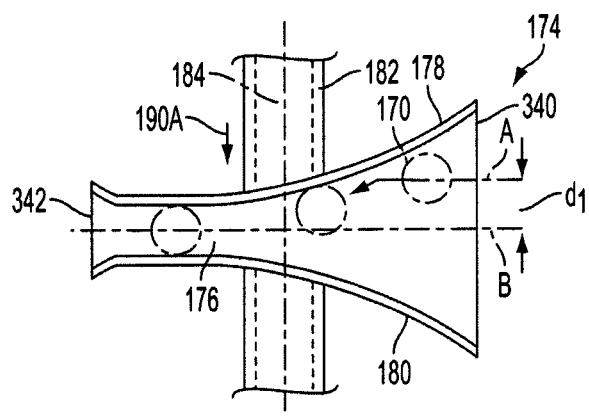

The operation of the illustrated form control drum adjuster engager will become more apparent with reference to FIGS. 18A, 18B and 18C. In FIG. 18A, a control rod 182, that supports the control drum adjuster engager 174, has remained in one position. Consequently, as control drum finger 170 moves downwardly, the finger 170 engages the control drum adjuster engager along a line A and travels downwardly in a direction along line A from end portion 340 toward end portion 342. The walls or wings 178, 180 converge but do not alter the direction of travel of finger 170 other than guiding the finger along line A from end 340 toward end 342 as the piston approaches the bottom dead center position. The walls 178, 180 can be flared or diverge adjacent to end portion 342 so as to not interfere with the finger 170 as the piston moves away from the control drum adjuster engager toward the top dead center position.

FIG. 18B illustrates an example where the control drum adjuster engager has been moved axially in a direction indicated by arrow 190B parallel to the longitudinal axis 184 of the support shaft 182. This movement is accomplished by moving shaft 182, to which guide 174 is coupled or mounted, in the direction of arrow 190B. In this case, the center line of the control drum adjuster engager has been shifted by a distance d2 in the direction of arrow 190B from location A to location C. When the projection 170 engages the control drum adjuster engager, and continues to move downwardly as the piston approaches the bottom dead center position, eventually wing or wall 180 engages the finger and urges it to a path of travel along line C. As a result, the control drum is rotationally shifted to position one of the ports of the control drum, such as port C (FIG. 12), in alignment with the associated passageway (e.g. passageway 280C, FIG. 10A) to permit the flow of lubricant from the desired chamber section.

In FIG. 18C, the shaft 182 is shown shifted in the direction of arrow 190A (opposite to arrow 190B in FIG. 18B). Consequently, a line B is now aligned with the center of the control drum adjuster engager. The line B is spaced a distance d1 from line A of FIG. 18A. Note: d1 is not necessarily equal to d2 as it corresponds to the distance through which the control drum is to be rotated to position another port of the drum in alignment with an associated passageway leading to a chamber section. In FIG. 18C, as the piston advances toward the bottom dead center position, eventually the wing or side wall 178 will engage the projection or finger 170 to urge the finger toward the path B as the piston moves toward the bottom dead center position. Path B can correspond to the port B (FIG. 12) of the control drum being aligned with the passage 280B that communicates with a chamber section such that oil can flow through passageway 280B (FIG. 10A) and the control drum port B.

Figure 19A:
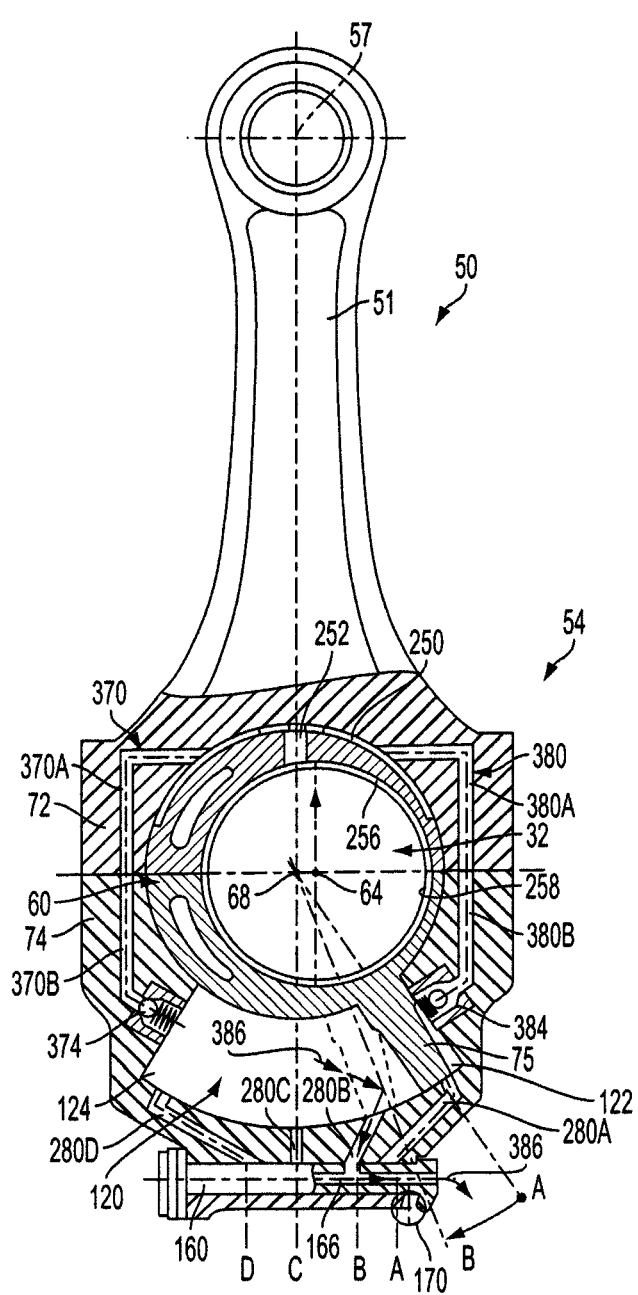
FIG. 19A is a front view, partially in section, of the form of a connecting rod assembly shown in FIG. 1 and illustrating a first exemplary approach for passing oil to and from first and second chamber sections on opposite sides of a projection of an eccentric coupler.
Figure 19B:
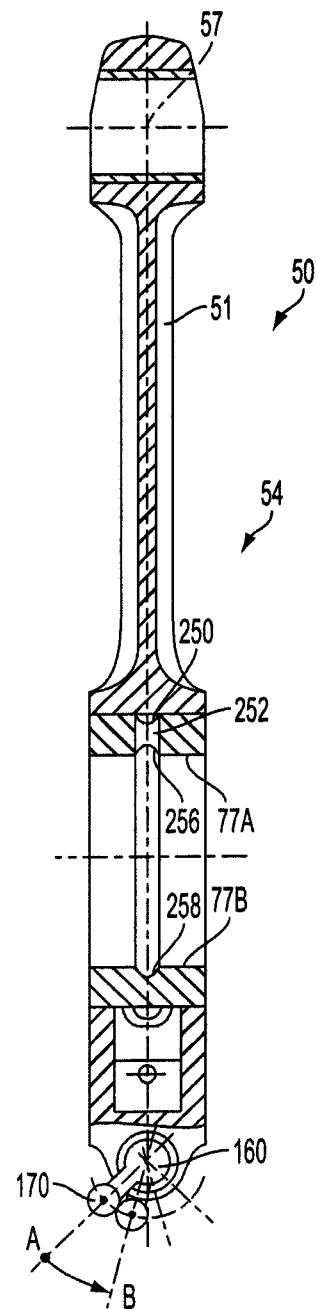
FIG. 19B is a vertical sectional view of the connecting rod assembly of FIG. 19A, taken in a direction perpendicular to the direction shown in FIG. 19A.

FIGS. 19A and 19B illustrate an exemplary approach for delivering lubricating oil to a desired chamber section 122, 124 of the chamber 120 while allowing the flow of lubricating oil from the opposed chamber to thereby accomplish movement of the projection 75 and the desired adjustment of the compression ratio.

With reference to FIGS. 19A and 19B, assume that the finger 170 of the control drum is to be adjusted to adjust vane 75 from position A to position B. When in position A, the projection 75 overlies and blocks the outlet port A (FIG. 12) leading to passageway 280A. In addition, the other passageways are blocked off. Finger 170 is rotated, as previously explained, by engaging the finger with the control drum adjuster engager following movement of the control drum adjuster engager the required distance to cause the desired rotational movement of the finger 170 to open port B. The control drum rotates in response to rotation of the finger 170 to align passageway 280B with the port B. Under these conditions, pressurized oil flows from the region between the crank pin and eccentric bearing along passageway 256, through passageway 252, and to the passageway 250. A first fluid flow passageway 370 comprises a first portion 370A positioned within upper crank coupling portion 72 of the connecting rod assembly 50 and a second portion 370B extending through a lower portion 74 of the connecting rod assembly. Passageway 380 communicates from passageway 250 through a valve, such as a spring biased check valve 384, to the chamber section 122. A similar passageway 370, having an upper passageway section 370A and a lower passageway section 370B in the respective crank coupling sections of 72, 74 of the connecting rod assembly, is also provided. Passageway 370 communicates from passageway 250 through a check valve 374 to the chamber section 124. Upon positioning of port B of the control drum 160 in alignment with passageway 280B, oil flows, as indicated by arrow 386, from chamber section 124 through the passageway 280B, through port B and the passageway 166 of the control drum 160 to the oil pan of the internal combustion engine. In addition, as oil exits from chamber 124, oil flows via passageway 380 and check valve 384 into the chamber section 122. As a result, the projection or vane 75 is forced by TEC (FIG. 7B) to shift from position A, shown in solid lines in FIG. 19A, to the position B, shown in dashed lines in FIG. 19A. When the vane 75 reaches position B, the left edge of the vane in FIG. 19A closes the passageway 280B and stops the flow of oil from chamber section 124. Because of the incompressible nature of liquid, the liquid in chambers 122 and 124, with both check valves 374 and 384 closed, holds the vane in the position B to which it has been moved. As vane 75 is moved to a position B, the eccentricity of the eccentric coupling bearing 60 is also moved. This results in a change in the compression ratio as previously explained. To move the vane 75 to another position or back, the control drum is adjusted to open up another of the passageways 280A through 280D to its associated chamber section to allow the passage of liquid from the associated chamber section. In addition, liquid is admitted, via either check valve 374 or 384, to the chamber section that is opposite to the chamber section from which liquid is being delivered.

Numerous approaches can be utilized for delivering liquid to and removing liquid from the desired chamber sections. Additional examples are described below.

The embodiment of FIGS. 20 and 21 can be employed to utilize oil pressure provided by an engine oil pump to supplement the torque required to pivot the vane in an engine design with low connecting rod forces in comparison to designs with higher connecting rod (e.g., TEC) forces that are available to assist in the vane movement to adjust the compression ratio of the engine. In the embodiment of FIGS. 20 and 21, like numbers to those shown in FIGS. 19A and 19B are utilized for like components and are not discussed in detail.

In the embodiment of FIG. 20, rather than utilizing a passageway 370 extending through both the upper and lower crank coupling sections 72, 74 of the connecting rod assembly, a passageway 370' extends from a control drum 160' through the check valve 374 to the chamber section 124. The passageway 370' continuously communicates with the interior passageway 166 of the drum 160'. More specifically, in this example the interior drum passageway 166 communicates through a port 400 to an annular recess 402 in the exterior surface 320' of the control drum 160'. The passageway 370' communicates with the recess 402 and thus is in continuous communication with the interior of the control drum 160'. A pressure valve 404 is positioned at the exit passageway from the interior 166 of control drum 160' to the oil pan of the engine. The setting of pressure valve 404 establishes a pressure within the passageway 166 and also at the check valve 374 that tends to bias the check valve 374 toward an open position. The pressure valve 404, which can be spring biased, can be at a fixed pressure or adjustable. The pressure at pressure valve 404 is desirably much lower than the pressure of the engine lubricating system. As one example, the pressure in the control drum passageway can be less than one-half of the pressure in the lubrication system. As another example, the pressure threshold set by the pressure valve can be about one-tenth of the pressure of the lubrication system. For example, 0.3 bar pressure in passageway 166 versus 3.0 bar pressure of the engine lubrication system. When epsilon is to be increased (corresponding to the vane being moved to the left in FIG. 20), one of the bores (e.g., bore 280B, 280C or 280D) to the left of the position of vane 75 is opened by the drum controller 160' by rotating the drum controller as previously explained. As a result, the vane 75 is moved clockwise at least in part assisted by the pressure differential between the engine oil pressure and the pressure in passageway 370' maintained by pressure valve 404. The eccentric torque TEC when acting in the same direction as the pressure differential also assists in moving the vane in the clockwise direction. The epsilon adjustment occurs in this example until such time as the vane 75 moves to a position overlaying and closing the port that was opened (for example, port 280B if the vane is moved from position A to position B shown in FIG. 20). In FIG. 20, since the passageway 370 that extended through the upper section 72 and lower section 74 to check valve 374 of FIG. 19A has been eliminated, the passageway 250 can be shortened from that shown in FIG. 19A to a shortened arcuate passageway 250' shown in FIG. 20. Otherwise the operation of the embodiment of FIGS. 20 and 21 is like that shown in FIGS. 1 and 19A.

Figure 22:
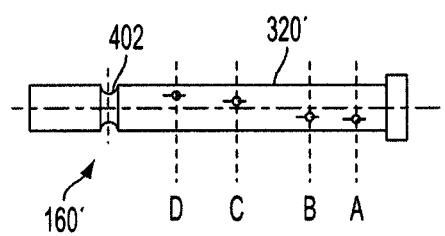
FIG. 22 illustrates an embodiment of a drum controller that is an alternative to the drum controller embodiment of FIG. 12 and that is usable, for example, in the connecting rod assembly of FIG. 20.
Figure 23:
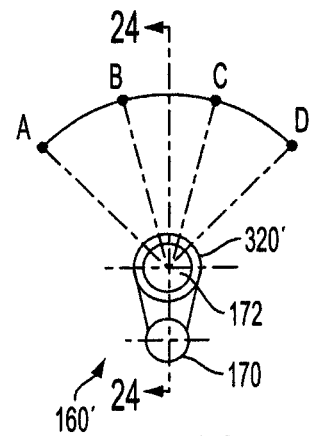
FIG. 23 is an end view of the drum controller embodiment of FIG. 22.
Figure 24:
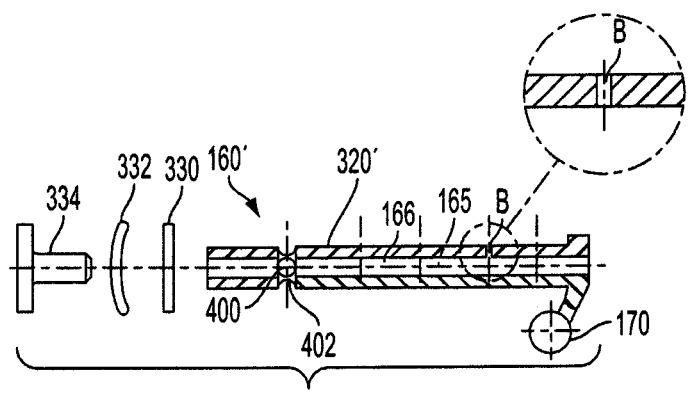
FIG. 24 is a vertical sectional view of the drum controller embodiment of FIG. 23, taken along line 24-24 of FIG. 23.

FIGS. 22 through 24 illustrate an exemplary control drum 160' of FIG. 20 in greater detail. It should be noted that the pressure valve 404 shown in FIG. 20 is not shown in FIG. 24 although pressure valve 404 would desirably be positioned in the passageway 166 at the right-hand end portion of the control drum 160' shown in FIG. 24.

FIGS. 25A, 25B and 26 illustrate yet another approach for delivering lubricating fluid to respective chamber sections 122, 124 of the vane receiving chamber 120 of the illustrated connecting rod assembly construction. In the embodiment of these figures, the passageways 370, 380 of FIG. 19A through the housing sections 72, 74 have been eliminated. Instead, lubricating oil is delivered to the desired section 122 or 124 via a passageway extending through the projection or vane 75". In this example, corresponding components are given the same numbers as in FIG. 1. Thus, for example, the control drum 160 can be the same as illustrated above in connection with FIG. 1. The vane 75", however, in this case is designated with a """ to indicate that it has a different structure than the vane 75 of FIG. 1.

In the embodiment of FIG. 25, oil from the engine lubricating system is pressurized and flows in grooves 256, 258 along the interior of an eccentric connecting rod bearing 60. This oil flows into a port 420 extending downwardly into the interior of the vane 75". The bore 420 communicates through an upper passageway 422 (FIG. 25B) to a first check valve 424 and through a lower passageway 426 (FIG. 2513) to a lower check valve 428. These check valves 424, 428 respectively control the flow of oil from bore 420 through a passageway 430 to chamber section 122 and from bore 420 through a passageway 432 to the chamber section 124. In FIGS. 25A and 25B, the vane 75" and check valves 424, 428 are shown in their operating conditions wherein the vane 75" is being moved from position C to position B. Under these conditions, port B of drum controller 160 is aligned with passageway 280B so that oil from chamber section 122 can be delivered through passageway 280B and the internal passage 166 of drum controller 160 to the oil pan as indicated by arrows 434 in FIG. 25A. Under these conditions, check valve 424 is closed so that oil is not flowing through this check valve into chamber section 122. In contrast, check valve 428 is open such that oil flows through passageway 432, as indicated by arrows 436 In FIG. 25A, into the chamber section 124. Consequently, as the eccentricity torque TEC is applied in a counter-clockwise direction in FIG. 25A (see e.g., FIG. 7A) oil is withdrawn from chamber section 122 while flowing into chamber section 124, resulting in the movement of the vane 75" away from the position C shown in FIG. 26 and toward the position B. Movement of the vane will continue until the right edge of the vane overlies and closes off the passageway 280B. The check valves 424, 428 (FIG. 25B) are both closed and the liquid in chamber sections 122, 124 holds the vane in the position to which it has moved.

FIGS. 27 through 32 illustrate an exemplary eccentric connecting rod bearing usable in the embodiments of FIGS. 25A and 26 in greater detail, and in particular illustrate a construction of the vane 75" with a passageway 420, check valves 424, 428 and associated outlet passageways 430, 432.

FIGS. 33 and 34 illustrate a still further approach for delivering oil to and removing oil from respective chamber sections 122, 124 of a vane receiving chamber as the vane position is adjusted to adjust the compression ratio of an engine.

The embodiment of FIGS. 33 and 34 operates in the same manner as the embodiment of FIGS. 20 and 21, except that, instead of providing an oil supply passageway 380 through a check valve 384 to the chamber section 122 as in FIG. 20, a pressurized oil delivery flow passageway 450 is provided within the vane 75'". The passageway 450 communicates through a passage 452 to the interior of chamber section 122. In this embodiment, chamber section 122 corresponds to the low compression ratio (low epsilon) side of the system and a single check valve (not shown in FIG. 33, but shown in FIGS. 36 and 37) can be used to control the flow of lubricating oil into chamber 122 without a similar high pressure flow path being needed for delivering oil to the chamber section 124. As in the case of the embodiment of FIG. 20, oil from the interior passageway 166 of the control drum 160' can flow through passageway 370', through check valve 374, and to the chamber section 124. A pressure valve 404 establishes the desired pressure within chamber 166, as discussed above in connection with FIG. 20.

The internal combustion engine can comprise an oil pump operable to pump oil under pressure. The oil under pressure is delivered to a first passageway (450 in FIG. 33 and 380 in FIG. 20) that communicates with the chamber section (in this example chamber section 122) from which liquid (oil) is removed when the projection moves in a direction toward a lower engine compression ratio position. In this example of FIGS. 20 and 33, the internal combustion engine can further comprise a pressure valve in the control drum outlet passageway operable to establish the pressure in the control drum outlet passageway at a level that is less than the pressure in the first passageway of the oil under pressure from the oil pump when the oil is not flowing through the first one way valve (valve 384 in FIG. 20 and valve 474 in FIG. 37). Desirably, the pressure in the control drum outlet passageway is less than one half of the pressure in the first passageway when the first one way valve is closed and the oil pump is operating to pump oil under pressure to the first passageway. In a specific example discussed above in connection with claim 20, the threshold pressure in the control drum passageway is established by the pressure valve at 0.3 bar in comparison to a normal oil pressure in the engine at 3 bar.

It should be noted that the various one way valves can comprise check valves.

In the embodiments of FIGS. 25A and 33, a first passageway (430 in FIGS. 25A and 452 in FIG. 33) communicates through the projection (e.g., vane 75" in FIG. 25A or 75'" in FIG. 33) to the first chamber section 122 (in these examples), the first chamber section being positioned at the side of the projection in the direction in which the projection moves to reduce the combustion ratio of the internal combustion engine. Also, a first one way valve (e.g., 424 in FIGS. 25B and 474 in FIG. 37) is positioned in the first passageway and is carried by the projection. The internal combustion engine can also comprise a bypass passageway (e.g., via recess 402, opening 400 and the control drum passageway 166) through which the second passageway (e.g., 370' in FIG. 33) communicates with the first chamber section 122 when an outlet port (e.g., passageway 280B in FIG. 33) communicating with the first chamber section 122 is open, the bypass passageway comprising a liquid outlet and a pressure valve (e.g., pressure valve 404) adjacent to the liquid outlet operable to establish a threshold pressure that would have to be exceeded in the bypass passageway for liquid to flow through the liquid outlet. Thus, in this example the control drum passageway comprises the bypass passageway. In addition, the internal combustion engine can comprise an oil pump operable to pump oil under pressure, the oil under pressure being delivered to the first passageway. In the FIG. 33 embodiment, the pressure valve 404 can be set or be operable to establish a pressure in the control drum outlet passageway 166 at a level that is less than the pressure in the first passageway 370' when oil is not flowing through the first one way valve 474 and the oil pump is operating to pump oil under pressure to the first passageway.

Thus, to move the vane 75''' from the position C shown in solid lines in FIG. 33 to position B, port B of the control drum is aligned with passageway 280B to permit the flow of oil as indicated by arrow 470 from chamber section 122 through passageway 280B to the interior of the control drum. Oil flows along control drum interior 166 through passageway 370' and check valve 374 to the chamber section 124 to add oil to this latter chamber section 124 as oil is removed from the chamber section 122. The passageway 452 through the vane 75''' is closed under these conditions. When vane 75''' is moved to a position overlying the opening leading to passageway 280B, the flow of oil ends, the check valves 474 (FIGS. 36) and 374 (FIG. 33) are closed, and the vane is maintained in this desired position. To move the vane 75''' in the opposite direction, one of the ports to the left of the vane (e.g., port C or D) is then opened. Oil then exits from chamber section 124 through the now opened port and control drum. Oil is delivered to chamber section 122 from the vane 75''' through the passageway 452 and its associated check valve (see check valve 474 in FIG. 39).

FIGS. 35 through 39 illustrate an eccentric connecting rod bearing with a single oil delivery passage 452 through a vane 75''' that can be used in the embodiment of FIGS. 33 and 34. Components in common with those previously described in connection with alternative forms of eccentric connecting rod bearings have been given the same numbers in these figures and for this reason will not be discussed in detail.

FIG. 40 illustrates a portion of an internal combustion engine with a stepwise adjustable compression ratio. Two pistons 36 of the engine of FIG. 40 are shown. The connecting rod assemblies 50 have eccentric connecting rod bearings with respective projections (not shown in FIG. 40) that are pivoted to adjust the compression ratio of the cylinders of the engine. In the embodiment of FIG. 40, control drums with respective projecting fingers 170 and associated guides 174 for adjusting the rotational position of the respective fingers are shown and used to adjust the compression ratio as previously described.

Figure 41:
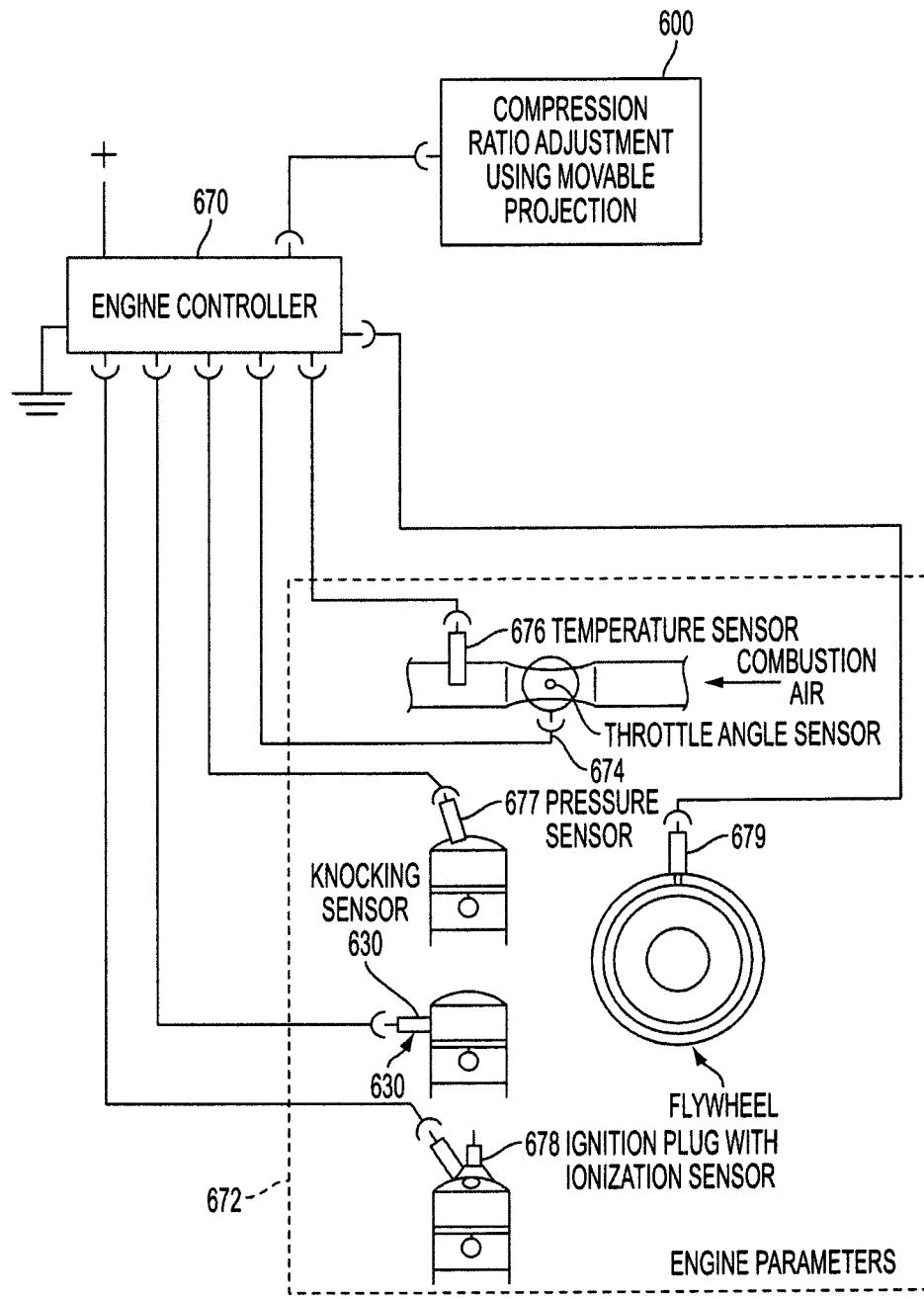
FIG. 41 schematically illustrates an exemplary control system for a stepwise variable compression ratio internal combustion engine comprising connecting rod assemblies with eccentric couplers having movable projections that are moved to move an eccentric of the eccentric couplers to vary the compression ratio of the internal combustion engine.

With reference to FIG. 41, an exemplary compression ratio adjuster 600, utilizing an eccentric connecting rod bearing with a projection such as a vane for each connecting rod, such as previously described, is shown for driving the eccentric portion of the eccentric connecting rod bearing to adjust the compression ratio of the engine such as previously described. The compression ratio adjuster 600 comprises a compression ratio adjuster that is responsive to control signals from an engine controller 670 to adjust the position of a control adjuster engager supporting shaft (such as shaft 182 in FIG. 2). In response to signals from the engine controller, the shaft 182 is moved to cause the desired stepwise adjustment of engine compression ratio. More specifically, in one suitable arrangement, the control signals from the engine controller control the operation of a stepper motor to shift the shaft 182 and supported compression adjustment guides 174, one per cylinder, to positions that engage and reposition compression ratio adjusters (e.g., fingers 170 to rotate control drums 160) so as to cause movement of respective associated vanes. The vanes pivot an eccentric connecting rod bearing coupled thereto to a desired position for a selected compression ratio.

Engine controller 670 can be a conventional engine controller, such as programmable controller, used in a vehicle which captures various vehicle parameter signals on a system bus utilized in the vehicle. These parameter signals can be used by the engine controller to generate motor control signals should conditions exist where it is desirable to selectively adjust the eccentric portion of eccentric connecting rod bearings to vary the stroke of the associated piston cylinders. These control signals can be responsive to one or more engine operating parameters. Exemplary parameters are indicated within block 672, together with schematic illustrations of sensors for measuring the parameters. For example, a throttle angle sensor 674 can be used to deliver a throttle angle signal via a data bus to the engine controller. The eccentric portion of each eccentric connecting rod bearing can be driven in clockwise or counterclockwise directions in response to control signals from the engine controller 670 in response to the throttle angle sensor signals. For example, under open throttle (full load) conditions, the compression ratio would typically be reduced. Under closed throttle (idle) conditions, the compression ratio would typically be increased. As another example, the combustion air temperature can be sensed by temperature sensor 676. In general, higher combustion air temperatures can be used to produce control signals that reduce the compression ratio. In contrast, lower temperature sensed signals can be used to increase the threshold to produce control signals that increase the compression ratio. As yet another example, a pressure sensor 677 can be used to sense the cylinder head pressure. Above a pre-defined pressure level at a certain crank shaft position, for example the top dead center position, the compression ratio would typically be decreased. Below this pre-determined pressure level, the compression ratio can be increased. The crank shaft position can be sensed by a crank shaft position sensor 679. As a further example, an ionization sensor, typically integrated into an ignition plug, senses, in the moment of ignition, the grade of the ionization of the air/fuel mixture of the internal combustion engine. Above a pre-determined threshold, the compression ratio typically can be decreased. Below the pre-determined threshold, the compression ratio typically can be increased. An ignition plug with an ionization sensor is indicated at 678 in FIG. 41. As another alternative, a knocking sensor indicated schematically at 680, typically mounted to a cylinder block, senses vibration spikes caused by uncontrolled ignition of the combustion mix, corresponding to the engine knocking. In response to such signals, the engine controller 670 can control the system to decrease the compression ratio. Control signals derived from combinations of sensed engine parameter conditions can also be used.

Having illustrated and described the principles of my invention with reference to a number of embodiments, it should be apparent to those of ordinary skill in the art that the invention may be modified in arrangement and detail without departing from these principles. I claim as my invention all modifications which fall within the scope of the following claims.

I claim:

1. A stepwise variable compression ratio internal combustion engine comprising:
   a crank shaft rotatable about a crank shaft axis and comprising a connecting rod coupling portion defining a first axis;
   at least one piston cylinder;
   a piston slidably received by said at least one cylinder so as to reciprocate between top dead center and bottom dead center positions within said cylinder;
   the crank coupling end portion comprising an eccentric adjuster receiving chamber;
   a connecting rod comprising a piston coupling end portion pivotally coupled to the piston and a crank coupling end portion pivotally coupled to the connecting rod coupling portion of the crank shaft, such that rotation of the crank shaft causes the connecting rod to reciprocate and move the piston between top dead center and bottom dead center positions;

a crank shaft coupler comprising an eccentric portion defining a second axis and operable to couple the connecting rod coupling portion of the crank shaft to the crank coupling end portion of the connecting rod, the eccentric portion being positioned such that pivoting of the crank shaft coupler about the first axis from one crank shaft coupler position to another crank shaft coupler position pivots the eccentric portion from a first eccentric position to a second eccentric position and shifts the second axis relative to the crank shaft axis to thereby vary the compression ratio of said at least one piston cylinder;

the crank coupling end portion of the connecting rod comprising a chamber that comprises a plurality of spaced apart outlet ports;

a projection coupled to the crank shaft coupler such that movement of the projection pivots the crank shaft coupler about the first axis, the projection positioned at least partially within the chamber and being shaped to separate the chamber into first and second chamber sections, the projection being selectively movable between plural positions, wherein in each position a respective outlet port is closed by the projection;

a first passageway communicating with the first section of the chamber, and a first valve allowing one-way liquid flow through the first passageway into the first section of the chamber;

a second passageway communicating with the second section of the chamber, and a second valve allowing one-way liquid flow through the second passageway into the second section of the chamber;

a compression ratio adjuster operable to selectively open a selected first of the outlet ports so as to permit liquid flow from the one of the first and second sections of the chamber in communication with the first outlet port through the first outlet port, wherein liquid flow through one of the first and second passageways and into the other of the first and second sections of the chamber other than said one of the first and second sections of the chamber in communication with the first outlet port, wherein the projection moves from a first projection position in a direction toward the first outlet port and to a second projection position closing the first outlet port with liquid in the respective first and second chambers assisting in maintaining the projection in the second projection position, the compression ratio adjuster also being operable to selectively open a selected second of the outlet ports other than the first outlet port to permit liquid flow from the one of the first and second sections of the chamber in communication with the second outlet port through the second outlet port, wherein liquid flows through one of the first and second passageways and into the other of the first and second sections of the chamber other than said one of the first and second sections of the chamber in communication with the second outlet port, wherein the projection moves from the second projection position in a direction toward the second outlet port and to a third projection position closing the second outlet port with liquid in the first and second sections of the chamber assisting in maintaining the projection in the third projection position, and wherein the movement of the projection moves the crank shaft coupler and varies the compression ratio of said at least one piston cylinder in steps defined by the positions to which the projection moves in response to opening the selected outlet ports.

2. The internal combustion engine according to claim 1 wherein the first and third projection positions are the same.

3. The internal combustion engine according to claim 1 wherein there are at least four of said outlet ports each corresponding to a position to which the projection is movable.

4. The internal combustion engine according to claim 1 wherein the first and second liquid passageways communicate with the respective first and second sections of the chamber at locations spaced from the projection.

5. The internal combustion engine according to claim 1 wherein at least one of the first and second liquid passageways communicates with a respective one of the first and second sections of the chamber through the projection.

6. The internal combustion engine according to claim 1 wherein the first fluid passageway communicates with the first chamber section through the projection and the second fluid passageway communicates with the second chamber section through the projection.

7. The internal combustion engine according to claim 1 wherein the chamber comprises an arcuate base portion having a radius with a center on the second axis, the projection comprising a vane pivotable about the second axis and comprising a distal end portion slidable along the base portion of the chamber, the outlet ports communicating through the base portion of the chamber at spaced apart locations along the base portion of the chamber, the vane being selectively movable to positions overlying and closing selected outlet ports that have been opened by the compression ratio adjuster to thereby vary the compression ratio of said at least one piston cylinder.

8. The internal combustion engine according to claim 1 wherein the engine comprises an oil pump operable to pump oil under pressure, a space existing between the crank shaft and crank shaft coupler, an oil port communicating from said space to an elongated gap that extends circumferentially about a portion of the crank shaft coupler at a location spaced from the projection, the first and second fluid passageways communicating with the gap, oil under pressure from the oil pump being delivered to the gap and from the gap to the first and second fluid passageways.

9. The internal combustion engine according to claim 1 wherein the engine comprises an oil pump operable to pump oil under pressure, a space existing between the crank shaft and crank shaft coupler, an oil port communicating from said space to at least one of the first and second fluid passageways such that oil under pressure from the oil pump is delivered to said at least one of the first and second fluid passageways.

10. The internal combustion engine according to claim 1 wherein the crank shaft coupler comprises first and second eccentric shell portions, at least a major portion of the second eccentric shell portion being spaced further from the piston than the first eccentric shell portion, and wherein the projection extends outwardly from the second eccentric shell portion.

11. The internal combustion engine according to claim 10 wherein the projection comprises an integral unitary monolithic portion of the second eccentric shell portion.

12. The internal combustion engine according to claim 10 wherein the first eccentric shell portion comprises a first crank shaft bearing surface positioned to pivot in contact with the connecting rod coupling portion of the crank shaft and a first connecting rod bearing surface positioned to pivot in contact with the crank coupling end portion of the connecting rod, and wherein the second eccentric shell portion comprises a second crank shaft bearing surface positioned to pivot in contact with the connecting rod coupling portion of the crank shaft and a second connecting rod bearing surface positioned to pivot in contact with the crank coupling end portion of the connecting rod, and wherein the average coefficient of friction of the first connecting rod bearing surface is less than the average coefficient of friction of the second connecting rod bearing surface.

13. The internal combustion engine according to claim 12 wherein the first and second crank shaft bearing surfaces comprise a bearing material, wherein the first connecting rod bearing surface comprises bearing material, and wherein the second connecting rod bearing surface comprises a material having a higher coefficient of friction than the coefficient of friction of the bearing material.

14. The internal combustion engine according to claim 10 wherein the crank coupling end portion comprises first and second crank coupling sections, the first crank coupling section being nearer to the piston than the second crank coupling section, at least a major portion of the chamber being located in the second crank coupling section, the first and second crank coupling sections being detachably fastened together.

15. The internal combustion engine according to claim 1 wherein the crank coupling end portion comprises first and second crank coupling sections, the first crank coupling section being nearer to the piston than the second crank coupling section, at least a major portion of the chamber being located in the second crank coupling section, the first and second crank coupling sections being detachably fastened together.

16. The internal combustion engine according to claim 1 wherein the compression ratio adjuster comprises a control drum pivoted to the connecting rod coupling portion, the control drum comprising an outlet passageway and a plurality of inlet ports each in communication with the outlet passageway, the inlet ports being spaced apart along the length of the control drum and having respective openings at different rotational positions at the surface of the control drum, each inlet port being associated with a respective one of the chamber outlet ports, the control drum being selectively pivotable to plural rotational positions, wherein at each such rotational position a respective inlet port and associated outlet port communicate with one another to provide a fluid passageway from the first or second chamber section of the chamber to which the outlet port communicates.

17. The internal combustion engine according to claim 16 wherein one or more of the inlet ports and the outlet passageway are sized to throttle the flow of liquid from the chamber sections.

18. The internal combustion engine according to claim 16 comprising a pressure valve in the control drum outlet passageway.

19. The internal combustion engine according to claim 16 wherein the internal combustion engine comprises an oil pump operable to pump oil under pressure, the oil under pressure being delivered to the first of said first and second passageways, the first passageway communicating with the chamber section from which liquid is being removed when the projection moves toward a lower compression ration position, the internal combustion engine further comprising a pressure valve in the control drum outlet passageway operable to establish the pressure in the control drum outlet passageway at a level that is less than the pressure in the first passageway of the oil under pressure from the oil pump when the oil is not flowing through the first one way valve.

20. The internal combustion engine according to claim 19 wherein the pressure in the control drum outlet passageway is less than one half of the pressure in the first passageway when the first one way valve is closed and the oil pump is operating to pump oil under pressure.

21. The internal combustion engine according to claim 16 wherein the control drum is pivotable about a longitudinal control drum axis to the plural rotational positions, the longitudinal control drum axis being perpendicular to the crank shaft axis, the control drum comprising a drum position adjuster projecting away from the longitudinal axis of the control drum and away from the chamber, a drum position adjuster engager movable in respective directions parallel to the crank shaft axis to selected engagement positions each of said engagement positions corresponding to a respective variable compression ratio step, the drum position adjuster engager being positioned to engage the drum position adjuster as the piston approaches the bottom dead center position to pivot the drum position adjuster to pivot the control drum from one of said rotational positions to another of said rotational positions in response to movement of the drum position engager from one of said selected engagement positions to another of said selected engagement positions, whereupon the compression ratio is adjusted from one compression ratio step to another compression ratio step.

22. The internal combustion engine according to claim 21 wherein the control drum adjuster engager comprises a guide that opens toward the control drum adjuster, the guide comprising respective side walls that engage the drum position adjuster as the piston approaches the bottom dead center position, the guide being configured to move the drum position adjuster from one position to another position to thereby move the control drum from one rotational position to another rotational position in response to movement of the control drum adjuster engager from one selected engagement position to another selected engagement position.

23. The internal combustion engine according to claim 21 wherein the control drum adjuster engager comprises a base with converging side walls that engage the drum position adjuster as the piston approaches the bottom dead center position so as to move the drum position adjuster from one position to another position and thereby move the control drum from one rotational position to another rotational position in response to movement of the control drum adjuster engager from one selected engagement position to another selected engagement position.

24. The internal combustion engine according to claim 21 comprising an oil pan positioned below the crank shaft, wherein the drum position adjuster is positioned adjacent to the oil pan.

25. The internal combustion engine according to claim 24 wherein the compression ratio adjuster comprises an adjustable friction brake coupled to the control drum and operable to adjust the resistance of the control drum to rotation relative to the connecting rod coupling portion.

26. The internal combustion engine according to claim 24 wherein the control drum has a length that is less than the width of the second section of the crank coupling end portion in a direction perpendicular to the longitudinal axis of the connecting rod when the piston is in the bottom dead center position.

27. The internal combustion engine according to claim 26 wherein the drum position adjuster comprises a projection extending from one end of the control drum at an acute angle of from 12 degrees to twenty eight degrees from the longitudinal axis of the control drum.

28. The internal combustion engine according to claim 1 wherein the one way valves comprise check valves.

29. The internal combustion engine according to claim 1 wherein the first passageway communicates through the projection to the first chamber section, the first chamber section being positioned at the side of the projection in the direction in which the projection moves to reduce the combustion ratio of the internal combustion engine, the first one way valve being positioned in the first passageway and being carried by the projection.

30. The internal combustion engine according to claim 29 comprising a bypass passageway through which the second passageway communicates with the first chamber section when an outlet port communicating with the first chamber section is open, the bypass passageway comprising a liquid outlet and a pressure valve adjacent to the liquid outlet operable to establish a threshold pressure that would have to be exceeded in the bypass passageway for liquid to flow through the liquid outlet.

31. The internal combustion engine according to claim 30 wherein the compression ratio adjuster comprises a control drum pivoted to the connecting rod coupling portion, the control drum comprising a control drum outlet passageway and a plurality of inlet ports each in communication with the outlet passageway, the inlet ports being spaced apart along the length of the control drum and having respective openings at different rotational positions at the surface of the control drum, each inlet port being associated with a respective one of the chamber outlet ports, the control drum being selectively pivotable to plural rotational positions, wherein at each such rotational position a respective inlet port and associated outlet port communicate with one another to provide a fluid passageway from the first or second chamber section of the chamber to which the outlet port communicates, wherein the control drum outlet passageway comprises the bypass passageway, wherein the second passageway communicates with the first chamber section through the control drum outlet passageway.

32. The internal combustion engine according to claim 31 wherein the internal combustion engine comprises an oil pump operable to pump oil under pressure, the oil under pressure being delivered to the first passageway, the pressure valve being operable to establish a pressure in the control drum outlet passageway at a level that is less than the pressure in the first passageway when oil is not flowing through the first one way valve and the oil pump is operating to pump oil under pressure to the first passageway.

33. The internal combustion engine according to claim 1 wherein the forces on the connecting rod vary between compression and tension forces as the piston moves from a bottom dead center position to a top dead center position and back to a bottom dead center position, and wherein the eccentric portion is positioned at the side of the first axis that results in the eccentric torque opposing both a bearing torque and a holding torque at least when the forces on the connecting rod are in compression.

34. The internal combustion engine according to claim 1 wherein the eccentric portion has a portion of maximum eccentricity, wherein the connecting rod coupling portion of the crank shaft comprises a crank pin having a center line aligned with the first axis;
wherein for an internal combustion engine with a crank shaft rotatable in a clockwise direction when looking in a direction along the first axis from a position outside of the crank shaft coupler toward the crank shaft coupler, the portion of maximum eccentricity of the eccentric portion is positioned at the left side of the center line of the crank shaft pin; and
wherein for an internal combustion engine with a crank shaft rotatable in a counter-clockwise direction when looking in a direction along the first axis from a position outside of the crank shaft coupler toward the crank shaft coupler, the portion of the maximum eccentricity of the eccentric portion is positioned at the right side of the center line of the crank shaft pin.

35. The internal combustion engine according to claim 1 wherein the one of the first and second chamber sections toward which the projection is moved to increase the compression ratio is at a lower pressure than the pressure in the other of the first and second chamber sections when the internal combustion engine is running.

36. The internal combustion engine according to claim 1 wherein the first and second valves are closed upon movement of the projection to the second or third positions such that, while the outlet ports are closed, the liquid in the chamber sections maintain the projection in the position to which it has been moved.

37. The internal combustion engine according to claim 36 wherein the projection is pivoted toward an outlet port to be closed in either a clockwise or counter-clockwise direction depending upon the relative positions of the vane and outlet port to be closed, and wherein an eccentric bearing torque TEC is applied to the vane in respective clockwise and counter-clockwise directions as the piston moves from a top dead center position, to a bottom dead center position and back to the top dead center position, wherein the torque TEC, during times that TEC is applied in the direction in which the projection is being pivoted to close an outlet port, moves the vane toward the open outlet port.

38. The internal combustion engine according to claim 1 wherein the projection is pivoted toward an outlet port to be closed in either a clockwise or counter-clockwise direction depending upon the relative positions of the vane and outlet port to be closed, and wherein an eccentric bearing torque TEC is applied to the vane in respective clockwise and counter-clockwise directions as the piston moves from a top dead center position, to a bottom dead center position and back to the top dead center position, wherein the torque TEC, during times that TEC is applied in the direction in which the projection is being pivoted to close an outlet port, moves the vane toward the open outlet port.

39. The internal compression engine according to claim 1 comprising throttling openings or passageways through which liquid flows from the chamber sections.

40. A stepwise variable compression ratio internal combustion engine comprising:
a crank shaft rotatable about a crank shaft axis and comprising a connecting rod coupling portion defining a first axis;
at least one piston cylinder;
a piston slidably received by said at least one cylinder so as to reciprocate between top dead center and bottom dead center positions within said cylinder;
the crank coupling end portion comprising an eccentric adjuster receiving chamber;
a connecting rod comprising a piston coupling end portion pivotally coupled to the piston and a crank coupling end portion pivotally coupled to the connecting rod coupling portion of the crank shaft, such that rotation of the crank shaft causes the connecting rod to reciprocate and move the piston between top dead center and bottom dead center positions;
a crank shaft coupler comprising an eccentric portion defining a second axis and operable to couple the connecting rod coupling portion of the crank shaft to the crank coupling end portion of the connecting rod, the eccentric portion being positioned such that pivoting of the crank shaft coupler about the first axis from one crank shaft coupler position to another crank shaft coupler position pivots the eccentric portion from a first eccentric position to a second eccentric position and shifts the second axis relative to the crank shaft axis to thereby vary the compression ratio of said at least one piston cylinder;

the crank coupling end portion of the connecting rod comprising a chamber that comprises a plurality of spaced apart outlet ports;

a projection coupled to the crank shaft coupler such that movement of the projection pivots the crank shaft coupler about the first axis, the projection positioned at least partially within the chamber and being shaped to separate the chamber into first and second chamber sections, the projection being selectively movable between plural positions, wherein in each position a respective outlet port is closed by the projection;

a first passageway communicating with the first section of the chamber, and a first valve allowing one-way liquid flow through the first passageway into the first section of the chamber;

a second passageway communicating with the second section of the chamber, and a second valve allowing one-way liquid flow through the second passageway into the second section of the chamber;

a compression ratio adjuster operable to selectively open a selected first of the outlet ports so as to permit liquid flow from the one of the first and second sections of the chamber in communication with the first outlet port through the first outlet port, wherein liquid flow through one of the first and second passageways and into the other of the first and second sections of the chamber other than said one of the first and second sections of the chamber in communication with the first outlet port, wherein the projection moves from a first projection position in a direction toward the first outlet port and to a second projection position closing the first outlet port with liquid in the respective first and second chambers assisting in maintaining the projection in the second projection position, the compression ratio adjuster also being operable to selectively open a selected second of the outlet ports other than the first outlet port to permit liquid flow from the one of the first and second sections of the chamber in communication with the second outlet port through the second outlet port, wherein liquid flows through one of the first and second passageways and into the other of the first and second sections of the chamber other than said one of the first and second sections of the chamber in communication with the second outlet port, wherein the projection moves from the second projection position in a direction toward the second outlet port and to a third projection position closing the second outlet port with liquid in the first and second sections of the chamber assisting in maintaining the projection in the third projection position, and wherein the movement of the projection moves the crank shaft coupler and varies the compression ratio of said at least one piston cylinder in steps defined by the positions to which the projection moves in response to opening the selected outlet ports;

wherein the chamber comprises an arcuate base portion having a radius with a center on the second axis, the projection comprising a vane pivotable about the second axis and comprising a distal end portion slidable along the base portion of the chamber, the outlet ports communicating through the base portion of the chamber at spaced apart locations along the base portion of the chamber, the vane being selectively movable to positions overlying and closing selected outlet ports that have been opened by the compression ratio adjuster to thereby vary the compression ratio of said at least one piston cylinder;

wherein the crank shaft coupler comprises first and second eccentric shell portions, at least a major portion of the second eccentric shell portion being spaced further from the piston than the first eccentric shell portion, and wherein the projection extends outwardly from the second eccentric shell portion;

wherein the first eccentric shell portion comprises a first crank shaft bearing surface positioned to pivot in contact with the connecting rod coupling portion of the crank shaft and a first connecting rod bearing surface positioned to pivot in contact with the crank coupling end portion of the connecting rod, and wherein the second eccentric shell portion comprises a second crank shaft bearing surface positioned to pivot in contact with the connecting rod coupling portion of the crank shaft and a second connecting rod bearing surface positioned to pivot in contact with the crank coupling end portion of the connecting rod, and wherein the average coefficient of friction of the first connecting rod bearing surface is less than the average coefficient of friction of the second connecting rod bearing surface; and wherein the crank coupling end portion comprises first and second crank coupling sections, the first crank coupling section being nearer to the piston than the second crank coupling section, at least a major portion of the chamber being located in the second crank coupling section, the first and second crank coupling sections being detachably fastened together.

41. The internal combustion engine according to claim 40 wherein the compression ratio adjuster comprises a control drum pivoted to the connecting rod coupling portion, the control drum comprising an outlet passageway and a plurality of inlet ports each in communication with the outlet passageway, the inlet ports being spaced apart along the length of the control drum and having respective openings at different rotational positions at the surface of the control drum, each inlet port being associated with a respective one of the chamber outlet ports, the control drum being selectively pivotable to plural rotational positions, wherein at each such rotational position a respective inlet port and associated outlet port communicate with one another to provide a fluid passageway from the first or second chamber section of the chamber to which the outlet port communicates;

wherein the control drum is pivotable about a longitudinal control drum axis to the plural rotational positions, the longitudinal control drum axis being perpendicular to the crank shaft axis, the control drum comprising a drum position adjuster projecting away from the longitudinal axis of the control drum and away from the chamber, a drum position adjuster engager movable in respective directions parallel to the crank shaft axis to selected engagement positions each of said engagement positions corresponding to a respective variable compression ratio step, the drum position adjuster engager being positioned to engage the drum position adjuster as the piston approaches the bottom dead center position to pivot the drum position adjuster to pivot the control drum from one of said rotational positions to another of said rotational positions in response to movement of the drum position engager from one of said selected engagement positions to another of said selected engagement positions, whereupon the compression ratio is adjusted from one compression ratio step to another compression ratio step; and wherein the control drum adjuster engager comprises a guide that opens toward the control drum adjuster, the guide comprising respective side walls that engage the drum position adjuster as the piston approaches the bottom dead center position, the guide being configured to move the drum position adjuster from one position to another position to thereby move the control drum from one rotational position to another rotational position in response to movement of the control drum adjuster engager from one selected engagement position to another selected engagement position.

42. The internal combustion engine according to claim 40 wherein the eccentric portion is positioned at the side of the first axis that results in the eccentric torque opposing both a bearing torque and a holding torque.

43. A stepwise variable compression ratio internal combustion engine comprising:
- a crank shaft rotatable about a crank shaft axis and comprising a connecting rod coupling portion defining a first axis;
- at least one piston cylinder;
- a piston slidably received by said at least one cylinder so as to reciprocate between top dead center and bottom dead center positions within said cylinder;
- the crank coupling end portion comprising an eccentric adjuster receiving chamber;
- a connecting rod comprising a piston coupling end portion pivotally coupled to the piston and a crank coupling end portion pivotally coupled to the connecting rod coupling portion of the crank shaft, such that rotation of the crank shaft causes the connecting rod to reciprocate and move the piston between top dead center and bottom dead center positions;
- a crank shaft coupler comprising an eccentric portion defining a second axis and operable to couple the connecting rod coupling portion of the crank shaft to the crank coupling end portion of the connecting rod, the eccentric portion being positioned such that pivoting of the crank shaft coupler about the first axis from one crank shaft coupler position to another crank shaft coupler position pivots the eccentric portion from a first eccentric position to a second eccentric position and shifts the second axis relative to the crank shaft axis to thereby vary the compression ratio of said at least one piston cylinder;
- the crank coupling end portion of the connecting rod comprising a chamber that comprises a plurality of spaced apart outlet ports;
- a projection coupled to the crank shaft coupler such that movement of the projection pivots the crank shaft coupler about the first axis; and
- means for delivering liquid to the chamber at one side of the projection and for removing liquid from the chamber at the other side of the projection to pivot the crank shaft coupler in a first direction to adjust the compression ratio, and means for delivering liquid to said other side of the projection and for removing liquid from the said one side of the projection to pivot the crank shaft coupler in a second direction opposite to the first direction to adjust the compression ratio.

44. An eccentric crank shaft coupler for a stepwise variable compression ratio internal combustion engine, the eccentric crank shaft coupler for coupling a crank shaft pin to a connecting rod, the eccentric crank shaft coupler comprising:
- first and second eccentric shell portions that together define an eccentric and an internal right cylindrical surface for coupling to the crank shaft pin and an external right cylindrical exterior surface for coupling to a connecting rod thereto, at least a major portion of the second eccentric shell portion being spaced further from the connecting rod than the first eccentric shell portion, the first and second right cylindrical surfaces having centers that are offset from one another, the offset corresponding to the eccentricity of the eccentric;
- a vane projecting outwardly from the second eccentric shell portion and coupled to the second eccentric shell portion such that movement of the vane in a first direction rotates the eccentric in a first direction about the crank shaft pin to adjust the compression ration of the engine and rotation of the vane in a second direction rotates the eccentric about the crank shaft pin in a second direction opposite to the first direction to adjust the compression ratio of the engine.

45. The eccentric crank shaft coupler according to claim 44 wherein the first shell comprises a first crank shaft bearing surface slidably coupled to the crank shaft pin and a first connecting rod bearing surface slidably coupled to the connecting rod, the second eccentric shell portion comprising a second crank shaft bearing surface slidably coupled to the crank shaft pin and a second connecting rod bearing surface slidably coupled to the connecting rod, and wherein the average coefficient of friction of the first connecting rod bearing surface is less than the average coefficient of friction of the second connecting rod bearing surface.

46. The eccentric crank shaft coupler according to claim 44 comprising at least one liquid flow vane passageway extending through the vane and wherein the second of the eccentric shells defines a liquid flow passageway communicating with the vane passageway.

47. The eccentric coupler according to claim 46 wherein the vane comprises first and second side surfaces and wherein the at least one vane passageway extends outwardly through one of the side surfaces of the vane.

48. The eccentric coupler according to claim 47 wherein the vane comprises at least one vane passageway extending outwardly through the first side surface of the vane and at least one vane passageway extending outwardly through the second side surface of the vane.

49. A connecting rod assembly for a stepwise variable compression ratio internal combustion engine comprising:
- a connecting rod comprising a piston coupling end portion and a crank coupling end portion, the crank coupling end portion comprising a projection receiving chamber that comprises a plurality of spaced apart outlet ports; and
- the connecting rod assembly further comprising a compression ratio adjuster rotatable between selectable positions each of such positions corresponding to a position that provides a liquid flow path through one of the outlet ports of the chamber and into the compression ratio adjuster.

50. The connecting rod assembly according to claim 49 wherein the compression ratio adjuster comprises a drum having an internal flow passageway with a plurality of spaced apart inlet ports each communicating with the internal flow passageway, the inlet ports being positioned at different positions about the longitudinal axis of the compression ratio adjuster such that rotation of the compression ratio adjuster positions a selected one of the outlet ports in communication with an associated chamber outlet port to provide a liquid flow path through the associated and communicating inlet and outlet ports.

51. The connecting rod assembly according to claim 50 wherein the chamber comprises an arcuate base portion having a radius and wherein the outlet ports communicate through the base portion of the chamber.

52. The connecting rod assembly according to claim 49 for coupling to a crank pin having a first axis and to an associated piston and piston cylinder, the connecting rod assembly comprising an eccentric crank shaft coupler defining a second axis and operable to couple the connecting rod coupling portion of the crank shaft to the crank coupling end portion of the connecting rod, the eccentric crank shaft coupler comprising an eccentric portion positioned such that pivoting of the crank shaft coupler about the second axis from one crank shaft coupler position to another crank shaft coupler position pivots the eccentric portion from a first eccentric position to a second eccentric position and shifts the second axis relative to the first axis to thereby vary the compression ratio of the associated piston cylinder, the eccentric crank shaft coupler comprising first and second eccentric shell portions, a projection extending from one of the first and second eccentric shell portions and into the projection receiving chamber, the chamber comprising a base portion through which the outlet ports communicate, the projection comprising a vane pivotable about the second axis, the vane comprising a distal end portion slidable along the base portion of the chamber, the vane being selectively movable to positions overlying and closing outlet ports that have been opened by the compression ratio adjuster to thereby vary the compression ratio of the associated piston cylinder.

53. A method of adjusting the compression ratio of an internal compression engine comprising:

delivering liquid to a first side of a projection within a chamber and removing liquid from a second side of the projection to pivot the projection in the chamber in a first direction;

delivering liquid to the second side of the projection and removing liquid from the first side of the projection to pivot the projection in the chamber in a second direction opposite to the first direction;

pivoting an eccentric connecting rod bearing in respective first and second directions in response to pivoting of the projection in the first and second directions to adjust the compression ratio of the internal combustion engine, the compression ratio of the engine corresponding to the position to which the eccentric connecting rod bearing is pivoted; and interrupting the pivoting of the projection upon the projection reaching a selected position.

\* \* \* \* \*